US012335752B2

(12) United States Patent
Hatamian et al.

(10) Patent No.: US 12,335,752 B2
(45) Date of Patent: *Jun. 17, 2025

(54) ANTENNA DEVICE, FWA COMMUNICATION SYSTEM WITH ANTENNA DEVICE, AND METHOD FOR FWA COMMUNICATION

(71) Applicant: PELTBEAM INC., Sherman Oaks, CA (US)

(72) Inventors: Mehdi Hatamian, Mission Viejo, CA (US); Puya Rofougaran, Irvine, CA (US); Arman Rofougaran, Newport Coast, CA (US)

(73) Assignee: PELTBEAM INC., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,754

(22) Filed: Jun. 19, 2024

(65) Prior Publication Data
US 2025/0008342 A1 Jan. 2, 2025

Related U.S. Application Data

(63) Continuation of application No. 18/329,923, filed on Jun. 6, 2023, now Pat. No. 12,082,001.
(Continued)

(51) Int. Cl.
*H04W 16/28* (2009.01)
*H01Q 3/08* (2006.01)
*H04W 16/26* (2009.01)

(52) U.S. Cl.
CPC .............. *H04W 16/28* (2013.01); *H01Q 3/08* (2013.01); *H04W 16/26* (2013.01)

(58) Field of Classification Search
CPC ......... H04W 16/28; H04W 16/26; H01Q 3/08
See application file for complete search history.

(56) References Cited

U.S. PATENT DOCUMENTS 11,595,110 B1 * 2/2023 Zhan ................... H04B 7/15535
2008/0094296 A1 4/2008 Lee
(Continued)

OTHER PUBLICATIONS

Final Office Action for U.S. Appl. No. 18/329,923 dated Dec. 27, 2023.
(Continued)

*Primary Examiner* — Junpeng Chen
(74) *Attorney, Agent, or Firm* — CHIP LAW GROUP

(57) ABSTRACT

Provided is a system that comprises an antenna device that includes a plurality of passive patch antennas on a planar substrate and a movable frame that supports the planar substrate, and a processor that controls a movement of the movable frame to align the plurality of passive patch antennas in a first 3D position coordinate at a first time-of-day such that an RF signal receptivity by one or more passive patch antennas of the plurality of passive patch antennas is increased from a first signal state to a second signal state at a specific location of the antenna device, and updates the movement of the movable frame to align the plurality of passive patch antennas in a second 3D position coordinate at a second time-of-day such that the RF signal receptivity is increased from the second signal state to a third signal state at the specific location.

20 Claims, 13 Drawing Sheets

Related U.S. Application Data

(60) Provisional application No. 63/427,055, filed on Nov. 21, 2022.

(56) References Cited

U.S. PATENT DOCUMENTS

| | | | |
|---|---|---|---|
| 2018/0145407 A1 | 5/2018 | Natsume | |
| 2019/0067792 A1* | 2/2019 | Au | H01Q 9/30 |
| 2019/0393598 A1 | 12/2019 | Logothetis et al. | |
| 2020/0389227 A1* | 12/2020 | Zhan | H04B 7/15535 |
| 2021/0167520 A1 | 6/2021 | Wang et al. | |
| 2022/0190474 A1* | 6/2022 | Houser | H01Q 5/307 |
| 2022/0330094 A1* | 10/2022 | Kothiwale | H04B 17/327 |
| 2022/0376747 A1 | 11/2022 | Liu | |
| 2022/0384947 A1 | 12/2022 | Liu | |

OTHER PUBLICATIONS

Non-Final Office Action for U.S. Appl. No. 18/329,923 dated Oct. 26, 2023.

Notice of Allowance for U.S. Appl. No. 18/329,923 dated Apr. 17, 2024.

* cited by examiner

ANTENNA DEVICE, FWA COMMUNICATION SYSTEM WITH ANTENNA DEVICE, AND METHOD FOR FWA COMMUNICATION

CROSS-REFERENCE TO RELATED APPLICATIONS/INCORPORATION BY REFERENCE

This Application makes reference to, claims priority to, and claims benefit from and is a Continuation Application of U.S. patent application Ser. No. 18/329,923, filed on Jun. 6, 2023, which claims priority from U.S. Provisional Application Ser. No. 63/427,055 filed on Nov. 21, 2022. The above-referenced Applications is hereby incorporated herein by reference in its entirety.

FIELD OF TECHNOLOGY

Certain embodiments of the disclosure relate to remote antenna and fixed wireless access (FWA) communication systems. More specifically, certain embodiments of the disclosure relate to an antenna device, a fixed wireless access (FWA) communication system with the antenna device, and a method for FWA communication for high performance wireless communication.

BACKGROUND

Typically, users near the edge of the cell in cellular networks often suffer from low signal-to-interference-plus-noise ratio (SINR) levels due to being far away from the base station. The cell-edge problem in cellular networks refers to the issue of poor signal quality and low data rates experienced by users located at the edge of the cell. This problem arises due to weak signal strength caused by distance-dependent path loss and multipath fading. It may not always be a feasible solution to increase the base station transmit power as it can lead to increased inter-cell interference.

Although many fixed wireless access (FWA) systems have been around for quite some time, currently, the conventional FWA systems are unable to provide the data speeds needed to compete with wired broadband connections. The next generation of 5G or 6G-based fixed wireless technology is expected to hit data rates in the order of several Gbps. The 5G FWA connections are expected to grow exponentially globally over the next decade, resulting in multifold traffic growth. However, there are many open technical challenges for a successful and practical use of the 5G FWA or the upcoming 6G FWA. In a first example, one of the most prominent technical issues is how to achieve cell center like performance even in the cell edge areas using FWA systems (e.g., a customer premise equipment (CPE)) without increasing the telecommunications infrastructure cost. Currently, conventional CPE performance becomes significantly degraded as the distance from the cellular signal source (e.g., the base station or a small cell) increases, for example, at the cell edge areas. In a second example, Quality of experience (QoE) is another open issue, which is a measure of a user's holistic satisfaction level with a service provider (e.g., Internet access, video streaming, or other carrier network-enabled services). The challenge is how to ensure a seamless connectivity as well as QoE without significantly increasing infrastructure cost, which may be commercially unsustainable with present solutions. In indoor scenarios, like a home or an enterprise, poor signal strength from a wireless network can make surfing the internet and downloading or uploading content a frustrating experience. Furthermore, the number of wireless sensors and IoT devices are rapidly increasing with the increase in smart homes, smart offices, enterprises, etc. Existing communication systems are unbale to handle such massive number of wireless sensors and IoT devices and their quality-of-service (QOS) requirements. In such cases, it is extremely difficult and technically challenging to support these end user devices for high-speed low latency applications. Thus, the inbuilt antennas of the conventional CPEs suffer from inconsistent performance in terms of data throughput and signal quality provided to its connected users, which aggravate in the cell edge areas.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An antenna device, a fixed wireless access (FWA) communication system with the antenna device, and a method for FWA communication for high performance wireless communication, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in an antenna device, a fixed wireless access (FWA) communication system with the antenna device, and a method for FWA communication for high performance wireless communication. The antenna device and method of the present disclosure significantly improves the performance of a customer premise equipment (CPE). The antenna device of the present disclosure establishes an out-of-band control link with the CPE and controls a movement of a plurality of passive patch antennas of the antenna device in a specific three-dimensional (3D) position coordinate at a given time-of-day such that a radio frequency (RF) signal receptivity by one or more passive patch antennas of the plurality of passive patch antennas is significantly increased. The antenna device overcomes scanning loss, signal attenuating or blocking obstacles, bring street side signal indoors, and significantly enhance personal hotspots in indoor area. The antenna device is a universal remote antenna that can be detachably attached to any CPE of any manufacturer in a Snap-On configuration, which then increases the performance of the CPE even if the CPE is in a cell edge area. In other words, users in the cell edge areas can have cell centre like performance when the antenna device is plugged with the CPE. In the following description, reference is made to the accompanying drawings, which form a part hereof, and in which is shown, by way of illustration, various embodiments of the present disclosure.

Figure 1A:
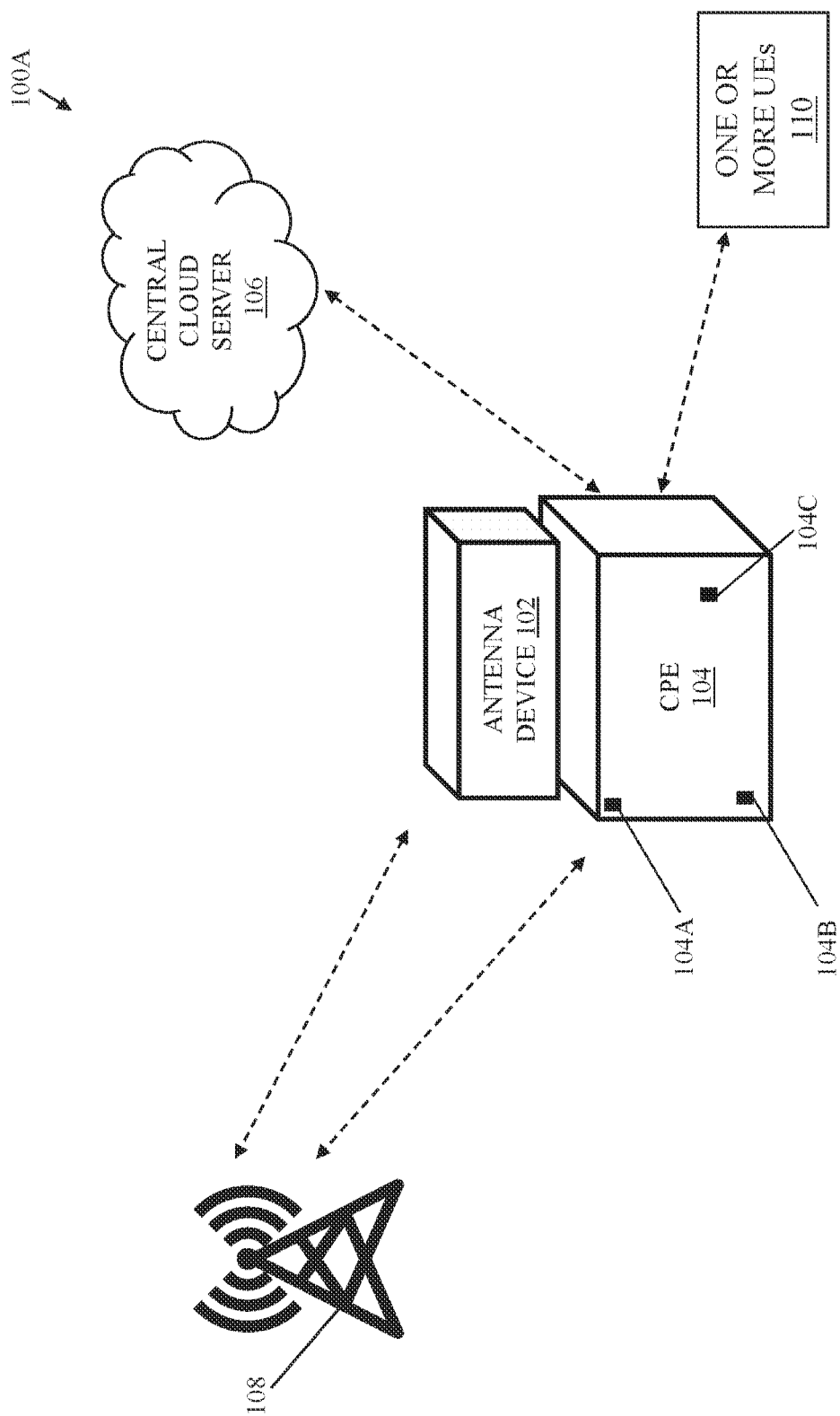
FIG. 1A is a diagram illustrating an exemplary fixed wireless access (FWA) communication system with a customer premise equipment (CPE) and an antenna device, in accordance with an exemplary embodiment of the disclosure.

FIG. 1A is a diagram illustrating an exemplary fixed wireless access (FWA) communication system with a customer premise equipment (CPE) and an antenna device, in accordance with an exemplary embodiment of the disclosure. With reference to FIG. 1A, there is shown a FWA communication system 100A that may include an antenna device 102 and a customer premise equipment (CPE) 104. In an implementation, FWA communication system 100A may further include a central cloud server 106. There is further shown a radio access network (RAN) node 106 (e.g., a base station or a small cell) and one or more user equipment (UEs) 110. In an implementation, the CPE 104 may include one or more inbuilt antennas 104A, and one or more processors 104B, and a modem 104C.

The antenna device 102 is designed and developed to be detachably coupled to the CPE 104 in a Snap-On configuration, i.e., the antenna device 102 is configured to be attached or detached quickly and easily with any CPE, such as the CPE 104. Alternatively, in another implementation, the antenna device 102 (i.e., the external antenna) may be connected to the CPE 104 (e.g., a CPE box) via short cables. The antenna device 102 may be a smart universal remote antenna, which can be plugged to any CPE of any manufacturer providing a cost-effective and significant performance improvement for CPEs, such as the CPE 104 (improves signal quality significantly up to 7 times in certain locations) as compared to conventional FWA devices and systems. In one implementation, the antenna device 102 may be configured to operate in C-band frequencies (e.g., 4-8 GHz or 3.7-4.2 GHZ) for 5G NR communication. In another implementation, the antenna device 102 may be multiband antenna device, which may operate in different frequencies band as per use case, for example, the antenna device 102 may be a XG-enabled remote antenna device, where XG refers to 5G or 6G radio communication.

The CPE 104 may be a 5G or 6G CPE that may connect several end-user devices at the same time, such as the one or more UEs 110, to the Internet through receiving RF signals (e.g., 5G signals in C-band) of a service provider (a mobile network operator or a wireless carrier network) communicated by the RAN node 108 (e.g., 5G base station) and then transferring those RF signals (e.g. 5G signals) into wireless local area network signals (e.g., Wi-Fi®) signals). In an implementation, there may be a subscriber identity module (SIM) inserted in the CPE 104 to subscribe a particular carrier network. Examples of the CPE 104 may include, but are not limited to an Internet gateway device, a CPE, or any piece of connected telecommunication equipment that is used for accessing the Internet or generally accessing services on a provider network, whether directly or indirectly connected to that carrier or cellular network that is placed on the customer side of the network and can be a demarcation point between the service provider network (WAN) and the customer's home network or LAN. or any customer premise equipment.

Figure 1B:
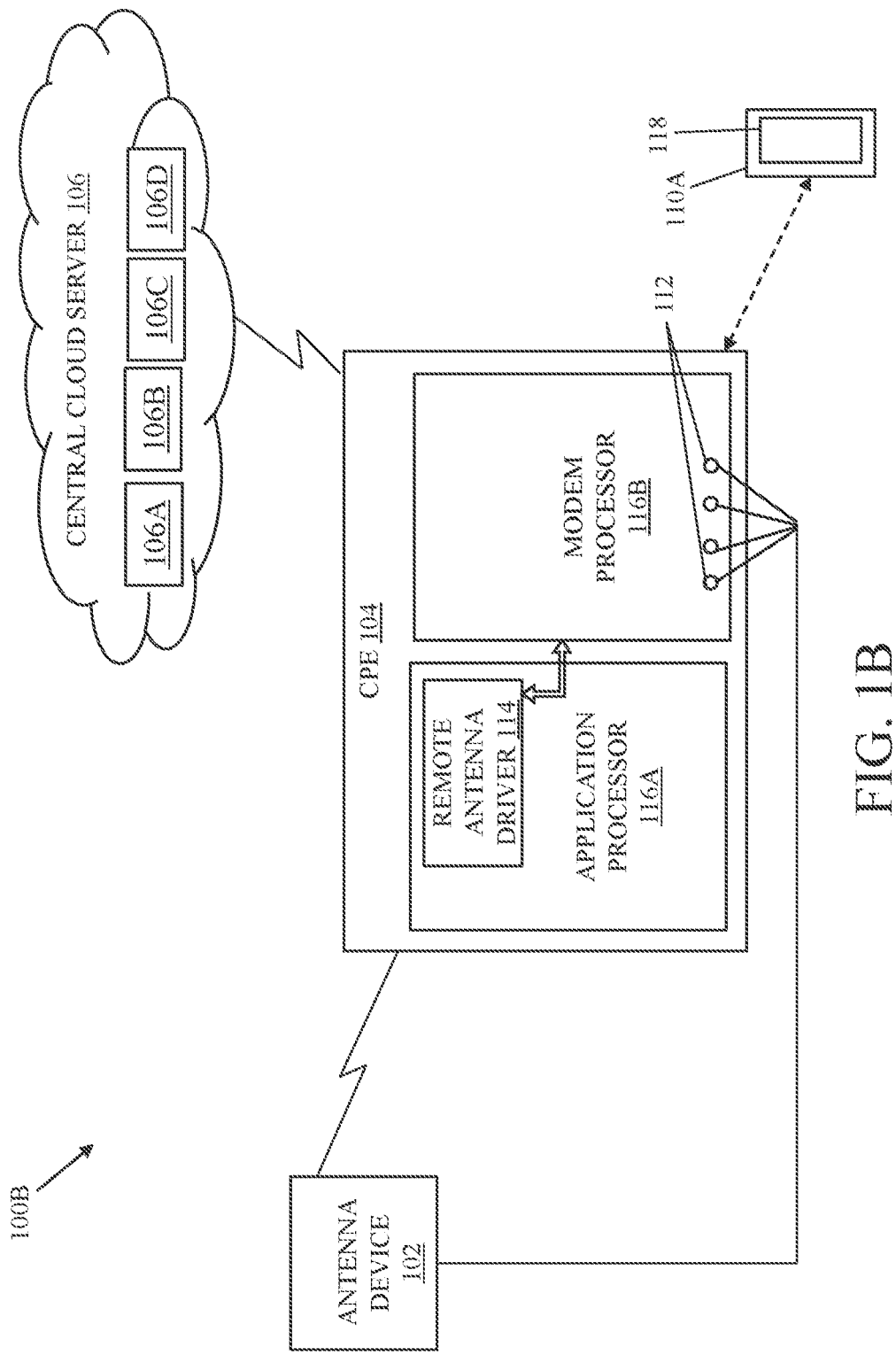
FIG. 1B is a diagram illustrating an exemplary fixed wireless access (FWA) communication system with a customer premise equipment (CPE) and an antenna device, in accordance with another exemplary embodiment of the disclosure.

In the present disclosure, the CPE 104 may be communicatively coupled to the central cloud server 106. In an implementation, the one or more inbuilt antennas 104A (i.e., internal antennas) of the CPE 104 may be bypassed when the antenna device 102 is detachably coupled to the CPE 104 in the Snap-On configuration. In such a case, the modem 104C of the CPE 104 may be disconnected from the inbuilt antennas 104A (i.e., internal antennas) of the CPE 104 and may be communicatively coupled to a plurality of passive patch antennas of the antenna device 102. The RF signals may be then received by the antenna device 102 and passed to the CPE 104. The modem 104C of the CPE 104 may be configured to perform usual modem functions, for example, modulation and demodulation, cellular connection management, error correction, user's data security, and network traffic management. In some implementations, in a case where the antenna device 102 and the CPE 104 is developed by the same manufacturer, the one or more inbuilt antennas 104A may be kept for back-up purpose or may be removed. The one or more processors 104B may be coprocessors, a combination of an application processor and a modem processor (an example is shown in FIG. 1B in an example), or other signal processors or control circuits. The CPE 104 may be an outdoor 5G-enabled CPE or an indoor 5G-enabled CPE.

The central cloud server 106 includes suitable logic, circuitry, and interfaces that may be configured to communicate with a plurality of CPEs, such as the CPE 104. In some implementation, the central cloud server 106 may directly communicate with the antenna device 102. In an example, the central cloud server 102 may be a remote management server that is managed by a third party different from the service providers associated with a plurality of different wireless carrier networks. In another example, the central cloud server 106 may be a remote management server or a data center that is managed by a third party, or jointly managed, or managed in coordination and association with one or more of the plurality of different wireless carrier networks. In an implementation, the central cloud server 106 may be a master cloud server or a master machine that is a part of a data center that controls an array of other cloud servers communicatively coupled to it for load balancing, running customized applications, and efficient data management.

The RAN node 108 may be a base station (e.g., an eNB, a Master eNB (MeNB for non-standalone mode, or a gNB) or a 5G or 6G enabled small cell). The RAN node 108 may be a fixed point of communication that may communicate information, in the form of RF signals or beams of RF signals, to and from communication devices, such as the antenna device 102 (or the CPE 104 when the CPE 104 is not coupled to the antenna device 102). Multiple base stations corresponding to one service provider may be geographically positioned to cover specific geographical areas.

Each of one or more UEs 110 may correspond to a telecommunication hardware used by an end-user to communicate. For example, each of the one or more UEs 106 may refer to a combination of a mobile equipment and subscriber identity module (SIM). Each of the one or more UEs 110 may be a subscriber of at least one of the plurality of different wireless carrier networks. Examples of the one or more UEs 106 may include, but are not limited to, a smartphone, a virtual reality headset, an augment reality device, a cable or satellite television set-top box, a VoIP station, or any other customized hardware for telecommunication.

In operation, the antenna device 102 may be detachably coupled to the CPE 104 in the Snap-On configuration. In an implementation, the one or more inbuilt antennas 104A (i.e., internal antennas) of the CPE 104 may be bypassed when the antenna device 102 is detachably coupled to the CPE 104 in the Snap-On configuration. Alternatively, in another implementation, the antenna device 102 (i.e., the external antenna) may be connected to the CPE 104 (e.g., a CPE box) via short cables instead of the Snap-On configuration. The antenna device 102 may be configured to establish an out-of-band control link (e.g., a Bluetooth Low Energy (BLE) link or other personal area network link) with the CPE 104. The CPE 104 may be configured to communicate an instruction to the antenna device 102 over the out-of-band control link. The antenna device 102 may be configured to align a plurality of passive patch antennas of the antenna device 102 in a specific three-dimensional (3D) position coordinate at a given time-of-day such that a radio frequency (RF) signal receptivity by one or more passive patch antennas of the plurality of passive patch antennas may be increased from a first signal state to a second signal state at a first location of the antenna device 102. Further, the performance and service of the CPE 104 that may serve the one or more UEs 110 may be proportionally increased from a first throughput rate to a second throughput rate with the increase in the signal receptivity from the first signal state to the second signal state. The second signal state manifest improved signal quality parameters as compared to the first signal state. The signal state may refer to signal quality parameters of the received signal, such as signal strength in decibels, signal-to-noise ratio (SNR), signal-to-interference-plus-noise ratio (SINR), and data throughout rate. The antenna device 102 significantly increases the performance of the CPE 104 such that the CPE 104 becomes capable to achieve cell center like performance even in the cell edge areas without increasing any telecommunications infrastructure cost.

In the conventional systems, many UEs, such as the one or more UEs 110, that are located beyond the communication range of the RAN node 108 or the UEs that suffer from inconsistent signal strength issues being in cell edge areas, either require additional infrastructure, such as dense deployment of small cells and conventional repeater devices to fill the coverage gaps in the cellular communication to enable multi-gigabit data communication or a wired broadband connection. However, such deployments increase the infrastructure cost (e.g., cost of deployment as well as maintenance), and still often the signal strength and data throughput vary throughout a day (i.e., signal fluctuations or data throughput rate fluctuations observed throughout a given 24-hours cycle in a day). It is observed during experimentation that the fluctuations or changes in signal quality at different times-of-day may be attributed to dynamic nature of the environment, e.g., any change in surroundings that has the potential to adversely impact signal propagation, cause signal loss, poor reach, or signal blockage by moving or stationary objects in surroundings. Further, a fluctuation (e.g., an increase or decrease) in the base station transmitting power at different times of day or a change in weather may further lead to fluctuations or changes in signal quality at different times of day. Furthermore, in certain scenarios, radiated RF beams from the RAN node 108 in different directions using the beam sweeping mechanism may be obstructed by one or more signal obstructing objects in a specific geographical area, for example, in and around a building. It is also observed that a change in radiation pattern of the RAN node 108 and a presence of reflective objects in the signal reception path may also contribute to the inconsistency of signal reception at a given location around a building. Currently, thus wired broadband connection is still preferred over fixed wireless access (FWA) systems and solutions, like a conventional CPE as conventional FWA systems are unable to provide the data speeds needed to compete with wired broadband connections.

In contrast to the conventional FWA systems, the FWA communication system 100A of the present disclosure enables to improve signal quality and data throughput of the UEs, such as the one or more UEs 110, by significantly improving the performance of the CPE 104 to which the one or more UEs 110 may be connected, while the need to deploy additional intermediate repeaters, small cells, or base stations. Instead of using inbuilt antennas of the CPE 104, the antenna device 102 employs intelligent time-of-day driven automatic alignment of the plurality of passive patch antennas to improve quality of RF signals captured from the RAN node 110 (e.g., an existing base station or an existing small cell). This time-of-day driven automatic alignment of the plurality of passive patch antennas of the antenna device 102 is observed to significantly improve the data throughput rate and improve signal receptivity (i.e., signal strength of captured RF signals) in the 5G NR communication by many fold as compared to conventional CPE or conventional FWA systems. An exemplary comparison observed during experimentation of existing FWA systems, such as a conventional CPE that uses inbuilt antenna versus the FWA system 100A that employs the antenna device 102, is shown and described, for example, in FIG. 6. The antenna device 102 when coupled to the CPE 104 and when in operation achieves cell center like performance even in the cell edge areas without increasing the telecommunications infrastructure cost. Moreover, since the antenna device 102 employs passive patch antennas, the antenna device 102 may be a low-power device, which can be powered by a battery, used especially for alignment of the plurality of passive patch antennas of the antenna device 102 at certain times-of-day.

Such automatic time-of-day specific alignment maintains a consistency of performance of the CPE 104 at different times of day for seamless connectivity of the one or more UEs 110 in indoor or outdoor scenarios connected to the CPE 104 over wireless signals (e.g., Wi-Fi® signals), thereby improving Quality of experience (QoE). Thus, the FWA communication system 100A by virtue of the simplified Snap-On connection with the CPE 104 may transform the CPE 104 into a high performance FWA device that ensures consistent performance in terms of improved data throughput and improved signal quality provided to its connected users, even in the cell edge areas.

FIG. 1B is a diagram illustrating an exemplary fixed wireless access (FWA) communication system with a customer premise equipment (CPE) and an antenna device, in accordance with another exemplary embodiment of the disclosure. With reference to FIG. 1B, there is shown a FWA communication system 100B that may include the antenna device 102 and the CPE 104, which may further include a plurality of external antenna ports 112, a remote antenna driver 114, and one or more processors, such as an application processor 116A and a modem processor 116B. The application processor 116A and the modem processor 116B may correspond to the one or more processors 104B of FIG. 1A.

In operation, a site survey of an environment around a physical area, such as around a building (e.g., an enterprise or a home), may be conducted. The site survey may be conducted using a smartphone, such as the UE 110A, and a heatmap may be generated for different locations around the building. The heatmap may indicate signal state (e.g., signal quality parameters) of a plurality of different locations where site survey is conducted. A plurality of candidate locations where the signal strength and performance (e.g., in terms of SNR or signal strength) may be highest (e.g., top 3 or top 5) among other locations or greater than a threshold signal quality, may be selected as a plurality of candidate installation locations for the antenna device 102. In an implementation, the smartphone (e.g., the UE 110A) may be a C-band capable smartphone. The smartphone (e.g., the UE 110A) may have an application 118 communicatively coupled to the central cloud server 106. The plurality of candidate installation locations where the signal strength and performance may be greater than the threshold signal quality, may be stored locally in the application 118 as well as pushed to the central cloud server 106. The candidate installation locations and their corresponding signal quality parameters may be stored at the central cloud server 106 as pre-deployment training information 106A, which may be used in training of an artificial intelligence (AI) inference engine 106B. Alternatively stated, the CPE 104 or the UE 110A communicatively coupled to the central cloud server 106 may be configured to communicate the pre-deployment training information 106A to the central cloud server 106. The pre-deployment training information 106A may comprise a signal quality state (e.g., a signal strength in decibels), a throughput rate (e.g., a download and upload speed), and other signal parameters (e.g., SNR, SINR, etc.) captured at a plurality of different locations inside or outside the building or an indoor area. In an implementation, such data may be captured at different times of day. The plurality of different locations may correspond to the plurality of candidate installation locations suitable for the antenna device 102.

In accordance with an embodiment, the application 118 may guide where is the best location to place the CPE 104 and the antenna device 102 based on the determined plurality of candidate installation locations. In an implementation, as the central cloud server 106 may have enhanced information of environment due to serving a number of CPEs in a geographical area where the building is located, the central cloud server 106 may instruct the UE 110A where is the most suitable place to place the CPE 104 and the antenna device 102 at different times of day. Thereafter, the antenna device 102 may be plugged to the CPE 104. For instance, the CPE 104 may comprise the plurality of external antenna ports 112, where a plurality of passive patch antennas of the antenna device 102 may be detachably coupled to the plurality of external antenna ports 112 of the CPE 104 in the Snap-On configuration. One or more inbuilt antennas of the CPE 104 may be bypassed when the antenna device 102 may be detachably coupled to the CPE 104 in the Snap-On configuration. The antenna device 102 may be configured to establish an out-of-band control link (e.g., a Bluetooth Low Energy (BLE) link or other personal area network link) with the CPE 104.

In accordance with an embodiment, the central cloud server 106 may be configured to select a set of parameters (e.g., an initial pan and tilt coordinates) for the antenna device 102 to orient the antenna device in an initial three-dimensional (3D) test position. The antenna device 102 may comprise the plurality of passive patch antennas distributed on a planar substrate (e.g., a printed circuit board (PCB) base material like FR4) defining a signal capture area. An example of the plurality of passive patch antennas distributed on the planar substrate is shown and described in detail, for example, in FIGS. 2A-2D. The antenna device 102 may further comprise a movable frame that supports the planar substrate on which the plurality of passive patch antennas are distributed. The antenna device 102 may further comprise one or more electric motors coupled to the movable frame, where the movement of the movable frame may be controlled by the one or more electric motors to align the plurality of passive patch antennas in different 3D position coordinates. Each of the electric motors may be a stepper motor, a servo motor, an actuator, or a combination thereof. The number of electric motors depends on the desired degree of freedom in moving the moveable frame.

The central cloud server 106 may be further configured to cause the CPE 104 and the antenna device 102 to discover a best 3D position, where an initial discovery time in the discovery operation may be about five minutes or less than five minutes. The best 3D position refers to a specific pan and tilt coordinates that ensures improved signal state of RF signal reception, for example, a higher signal strength and a higher data throughput rate as compared to other 3D positions at a given time-of-day. The antenna device 102 may then learn for 24 hours to fully complete the learning process, i.e., a training cycle after deployment and the discovery operation. After the post-deployment training cycle or learning process, the antenna device 102 may orient itself based on a time-of-day.

In accordance with an embodiment, the CPE 104 may comprise one or more processors 104B (e.g., the application processor 116A or the modem processor 116B). In the initial discovery and the 24 hours training cycle, the one or more processors may be configured to acquire a plurality of RF signals captured by the plurality of passive patch antennas of the antenna device 102 via the plurality of external antenna ports 112 of the CPE 104. In an example, the plurality of external antenna ports 112 may be SMA (Sub-Miniature version A) connectors.

In accordance with an embodiment, the one or more processors 104B (e.g., the application processor 116A or the modem processor 116B) may be further configured to determine a signal quality value of each of the plurality of RF signals acquired via the plurality of external antenna ports 112. The plurality of external antenna ports 112 may be communicatively coupled to the antenna device 102. The one or more processors 104B of the CPE 104 may be further configured to select at least one RF signal having a highest signal quality value from among the plurality of RF signals acquired via the plurality of external antenna ports 112 for the test 3D position. Like the signal quality value determined for the test 3D position, signal quality values (e.g., signal strength in decibels and data throughput rate) may be acquired for different 3D positions at different times of day for a given location of the antenna device 102. Such measured values of signal quality values for different 3D positions (e.g., different pan and tilt coordinates) of the antenna device 102, may be communicated to the CPE 104 by the antenna device 102 over the out-of-band control link. The CPE 104 may further communicate such measured values of signal quality values for different 3D positions (e.g., different pan and tilt coordinates) of the antenna device 102, to the central cloud server 106 as post-deployment training information 106C.

In accordance with an embodiment, the one or more processors 104B of the CPE 104 may be further configured to dynamically combine one or more RF signals of the plurality of RF signals acquired via the plurality of external antenna ports 112. The combined signal may be used to relay for end-user devices, such as the one or more UEs 110. The CPE 104 may include a modem that is known in the art and may perform known CPE modem functions, for example, modulation and demodulation, cellular connection management, error correction, user's data security, and network traffic management. However, the interaction between the modem 104C of the CPE 104 and the antenna device 102 may be done via the remote antenna driver 114. The effect of the modem 104C of the CPE 104 combining and adjusting the 3D positions of the antenna device 102 to maximize signal rank, RSRP, and SNR may complete in 24 hours post-deployment training cycle.

The antenna device 102 may comprise a controller configured to control a movement of the movable frame to align the plurality of passive patch antennas in a specific three-dimensional (3D) position coordinate at a given time-of-day such that a radio frequency (RF) signal receptivity by one or more passive patch antennas of the plurality of passive patch antennas in the signal capture area is increased from a first signal state to a second signal state at a first location of the antenna device 102. The second signal state has a higher signal quality and provides higher data throughput than the first signal state. Such control of the movement of the movable frame to align the plurality of passive patch antennas in the specific 3D position coordinate may be executed based on an instruction received from the CPE 104 over the out-of-band control link. The instruction received from the CPE 104 may comprise learned information 106D comprising a specific pan and tilt datum. The specific pan and tilt datum may be valid for a specific time period in a given time-of-day. A different instruction having another pan and tilt datum may be communicated by the CPE 104 at another time of day. In other words, the instruction received from the CPE comprises learned information that is different at different times of day. Alternatively, after the 24 hours training cycle, the antenna device 102 by itself may orient itself based on time-of-day to consistently improve the performance of the CPE 104. The movement of the movable frame may be automatically controlled at different times of day to align the plurality of passive patch antennas in different 3D position coordinates based on learned information 106D. Alternatively, in an implementation, instead of the instruction communicated by the CPE 104, the instruction may be communicated by the smartphone (e.g., the UE 110A) via the application 118 that may be communicatively coupled to the central cloud server 106. The application 118 may be executed to monitor the performance of the CPE 104 and through the Bluetooth connection, the application 118 may control the movements of the antenna device 102 for signal capture optimization. In such a case, the smartphone (e.g., the UE 110A) and the antenna device 102 may continue to access the central cloud server 106 but the CPE 104 may not directly send any movement commands to the external antenna, such as the antenna device 102.

Figure 2A:
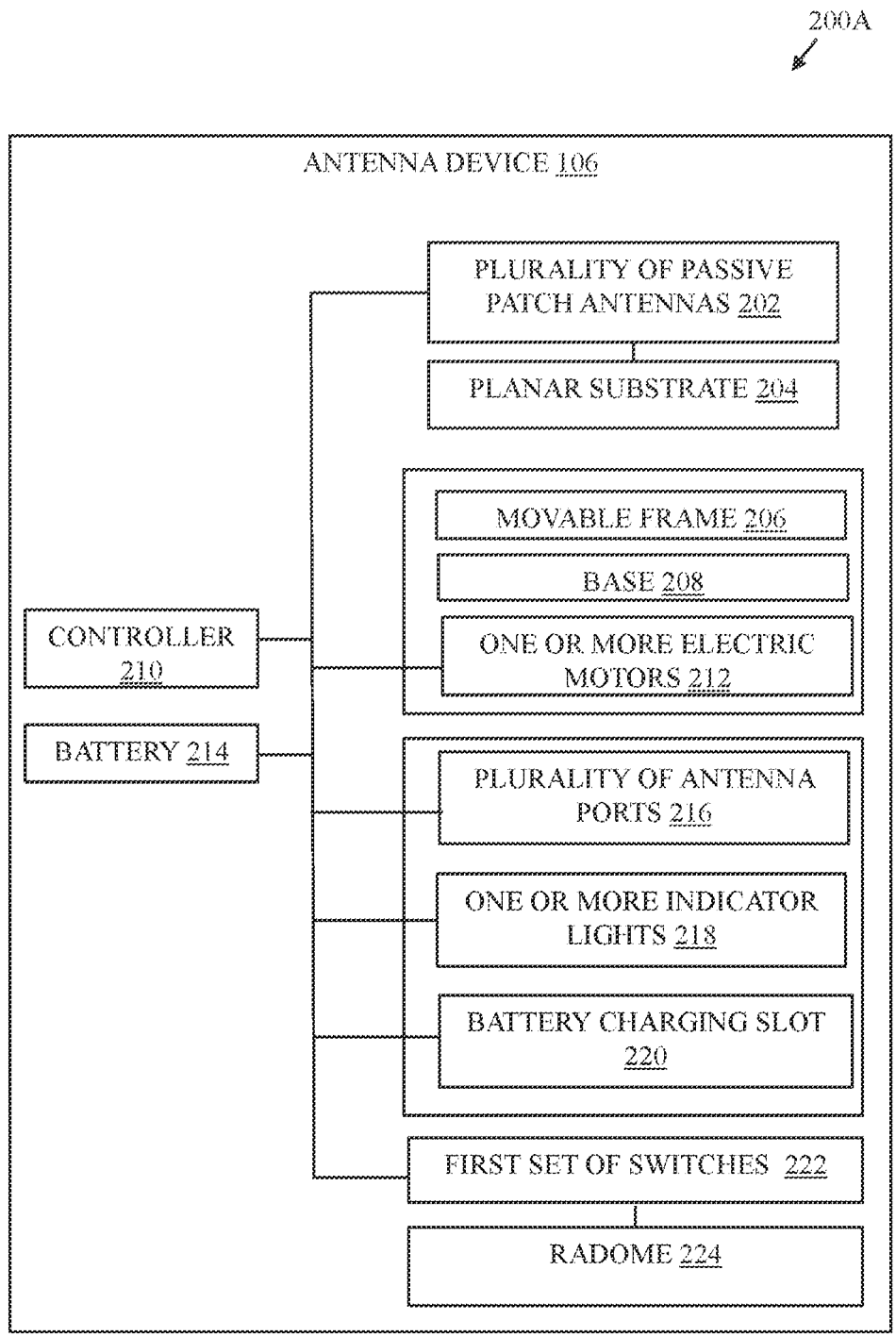
FIG. 2A is a block diagram that illustrates various components of an exemplary antenna device, in accordance with an exemplary embodiment of the disclosure.

FIG. 2A is a block diagram that illustrates various components of an exemplary antenna device, in accordance with an exemplary embodiment of the disclosure. FIG. 2A is explained in conjunction with elements from FIGS. 1A and 1B. With reference to FIG. 2A, there is shown a block diagram 200 of the antenna device 102. The antenna device 102 comprises a plurality of passive patch antennas 202, a planar substrate 204, a movable frame 206, a base 208, a controller 210, one or more electric motors 212 (e.g., two or three electric motors 212 depending on the desired degree of freedom in moving the moveable frame 206), and a battery 214. In an implementation, the antenna device 102 may further include a plurality of antenna ports 216, one or more indicator lights 218, a battery charging slot 220, a first set of switches 222, and a radome 224.

The plurality of passive patch antennas 202 may not require any external power source to operate. The plurality of passive patch antennas 202 may be distributed on the planar substrate 204 with a defined gap among them to increase isolation. Each of the plurality of passive patch antennas 202 may be flat, rectangular, square, or diamond shaped. The size of each of the plurality of passive patch antennas 202 may be same or different. The size of the plurality of passive patch antennas 202 may depend on the desired frequency range and radiation pattern. The plurality of passive patch antennas 202 may be detachably coupled to the plurality of external antenna ports 112 of the CPE 104 in the Snap-On configuration.

The planar substrate 204 may be a type of fiberglass material commonly used in printed circuit boards (PCBs), such as FR4 or other materials such as ceramic, polyimide, and Roger's substrate.

In an example, traditional patch antenna at C-Band generally require thick (costly) substrate and have limited gain. Their gain also doesn't scale in an array configuration due to surface wave and mutual coupling between antenna elements. In an implementation, the antenna device 102 may use air dielectric for virtually loss-less efficiency. Air is a good dielectric material because it has a low relative permittivity and loss tangent, which means that it is virtually loss-less, i.e., there is little energy lost as heat. This results in higher efficiency for the antenna device 102. In an implementation, the antenna device 102 may manifest one or more of the following: a) virtually no losses therefore very high gain (>9 dBi); b) may use of thin standard FR4 material combined with Rogers 4350B for routing low cost; c) may manifest very small coupling (<25 dB); d) no surface wave may be excited so gain scales linearly with number of the antenna elements; and d) dual polarization, high rejection (>25 dB), and broad frequency bandwidth, such as Horizontal to Vertical overall bandwidth. The dual polarization indicates that the antenna device 102 may transmit and receive signals in both horizontal and vertical polarizations. The high rejection indicates that the antenna device 102 may be capable of rejecting signals with a polarization perpendicular to the desired polarization by more than 25 dB. This means that the antenna device 102 can effectively filter out unwanted signals, resulting in a cleaner and more reliable signal. The antenna device 102 further manifest low operational temperature being passive.

The movable frame 206 may be custom, specially designed frame to support the planar substrate 204. The movable frame 206 may be mounted on a support structure, shown, and described, for example, in FIGS. 2B, 2C, and 2D. In an example, the movable frame 206 may be complementary to the shape and size of the planar substrate 204. The boundary or peripheral portions of the movable frame 206 may have perforations used to affix the planar substrate 204. The movable frame 206 may move in pan and tilt motion when the electric motors 212 rotate under the control of the controller 210.

The base 208 may support different components of the antenna device 102. For example, the support structure may be mounted on the base 208. In an implementation, the antenna device 102 comprises the plurality of antenna ports 216, one or more indicator lights 218, and the battery charging slot 220 at the base 208.

The controller 210 may be configured to establish the out-of-band control link with the CPE 104 and control the pan and tilt movement of the plurality of passive patch antennas 202. Examples of the controller 210 may include, but is not limited to a control circuit, a microcontroller, a microprocessor, a low-power logic circuit, or other controllers, like servo motor controllers.

The one or more electric motors 212 may be coupled to the movable frame 206. The movement of the movable frame 206 may be controlled by the electric motors 212 to align the plurality of passive patch antennas 202 in different 3D position coordinates. Each of the one or more electric motors 212 may be a stepper motor, a servo motor, an actuator, or a combination thereof.

The battery 214 may be a rechargeable battery. The battery 214 may be used to power the operations of at least the electric motors 212 and the controller 210. Examples of the implementation of the battery 214 may include but are not limited to a lithium polymer (Lipo) battery, a Zinc-based battery, and the like.

The plurality of antenna ports 216 corresponds to the number of passive patch antennas in the plurality of passive patch antennas 202. In some cases, two or more passive patch antennas may be pre-combined, and in such cases, the number of passive patch antennas may be more than the number of ports of the plurality of antenna ports 216. The plurality of antenna ports 216 may be pluggable and connected with the plurality of external antenna ports 112 via wired connectors.

The one or more indicator lights 218 may indicate the power status, signal quality, an out-of-band connectivity or disconnection status with the CPE 104, battery status, etc. of the antenna device 102. One or more combinations of color indicators, light, and buzzers may be used to fine tune the antenna device 102.

The battery charging slot 220 may be used to charge the battery 214. It is observed that the antenna device 102 may be operable to about 6 months (about 200 days) considering about 5 minutes of calibration and change in alignment of the plurality of passive patch antennas 202 by the one or more electric motors 212 in case the battery 214 is 3.7V, 5000 mAh, one Lipo battery. This explains the extremely low power usage by the antenna device 102.

In an implementation, the antenna device 102 may further include the first set of switches 222. The first set of switches 222 may be RF switches that may be configured to dynamically electrically connect or disconnect one or more passive patch antennas of the plurality of passive patch antennas 202 in one or more different antenna configurations. For example, three passive patch antennas may be combined in a L-shaped configuration, I-shaped configuration, or four passive patch antennas may be combined in a C-shaped configuration, o-shaped configuration, or other permutation and combination to maximize the receiving and transmitting of RF signals from outdoors-to-indoors and vice-versa at different times of day.

The radome 224 may be a protective structure that is placed over the antenna device 102 to protect the electronic components from the environment, such as rain, snow, wind, and other weather conditions.

Figure 2B:
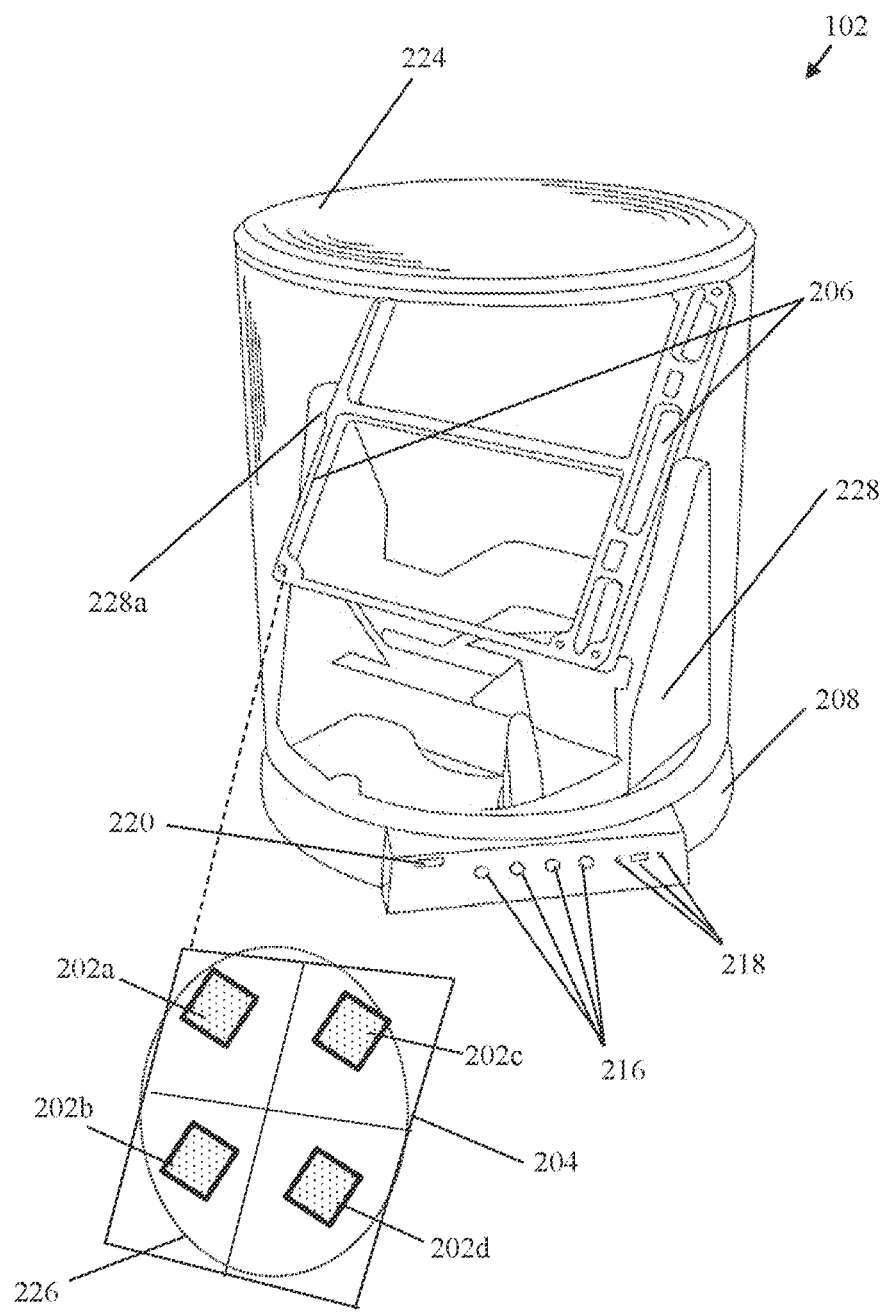
FIG. 2B is a diagram illustrating a perspective view of the antenna device of FIG. 2A along with an unmounted planar substrate, in accordance with an exemplary embodiment of the disclosure.

FIG. 2B is a diagram illustrating a perspective view of the antenna device of FIG. 2A along with an unmounted planar substrate, in accordance with an exemplary embodiment of the disclosure. FIG. 2B is explained in conjunction with elements from FIGS. 1A, 1B, and 2A. With reference to FIG. 2B, there is shown the antenna device 102 and the planar substrate 204 unmounted from the movable frame 206 of the antenna device 102. The plurality of passive patch antennas 202 may be distributed on the planar substrate 204. The distribution of the plurality of passive patch antennas 202 on the planar substrate 204 defines a signal capture area 226 of the antenna device 102. The distribution of the plurality of passive patch antennas 202 captures more signal power because of the improved signal capture area 226. The size of the signal capture area 226 may be independent of the frequency of individual antenna. Thus, in higher frequency, such as in millimeter wave, there may be more individual antennas, whereas in lower frequency 94G LTE), there may be lesser individual antennas. So, the signal capture size contributes to the signal capture capability. Further, with the same size of the signal capture area 226, as each of the plurality of passive patch antennas 202 are dual polarized, the antenna device 102 uses both polarizations and combines the signal power to maximize the signal strength that is being received at the antenna device 102, thereby improving the diversity.

The movable frame 206 provides an installation base and support for the planar substrate 204. The size of the movable frame 206 may be complementary to that of the planar substrate 204. The peripheral portions of the movable frame 206 may be used to affix the planar substrate 204 to the movable frame 206.

In this embodiment, the antenna device 102 comprises the plurality of antenna ports 216, one or more indicator lights 218, and the battery charging slot 220 at the base 208. The radome 224 provides a cylindrical protective covering to the various components of the antenna device 102, especially the plurality of passive patch antennas 202 on the planar substrate 204. The antenna device 102 may further comprise a support structure 228 on which the movable frame 206 may be mounted. The support structure 228 may move along the movable frame 206 for pan movement, whereas the movable frame 206 may move up and down for tilt movement along a pivot point 228a on the support structure 228. In an implementation, the pan movement may be plus minus +/−80° and the tilt (upwards and downwards movement) may be +/−30°. In another implementation, the pan movement may be 130-360 degrees and the tilt (upwards and downwards movement) may be +/−1-45°. The change in pan and tilt angles may be performed by a change in 1 degree using servo motors, such as the one or more electric motors 212.

In another embodiment, the CPE 104 may be integrated inside the antenna servo system, for example, in the antenna device 102. For example, the rear side of planar substrate 204 (e.g., rear side of the movable frame 206) on which the plurality of passive patch antennas 202 are placed may have enough space or stacking PCB boards to implement the CPE functions. This type of integration may further enhance the signal capture capability where the CPE 104 and the servo-controlled antenna (i.e., the antenna device 102) may be integrated in one box (i.e., a single-box structure) that may manifest further low loss and better performance.

Figure 2C:
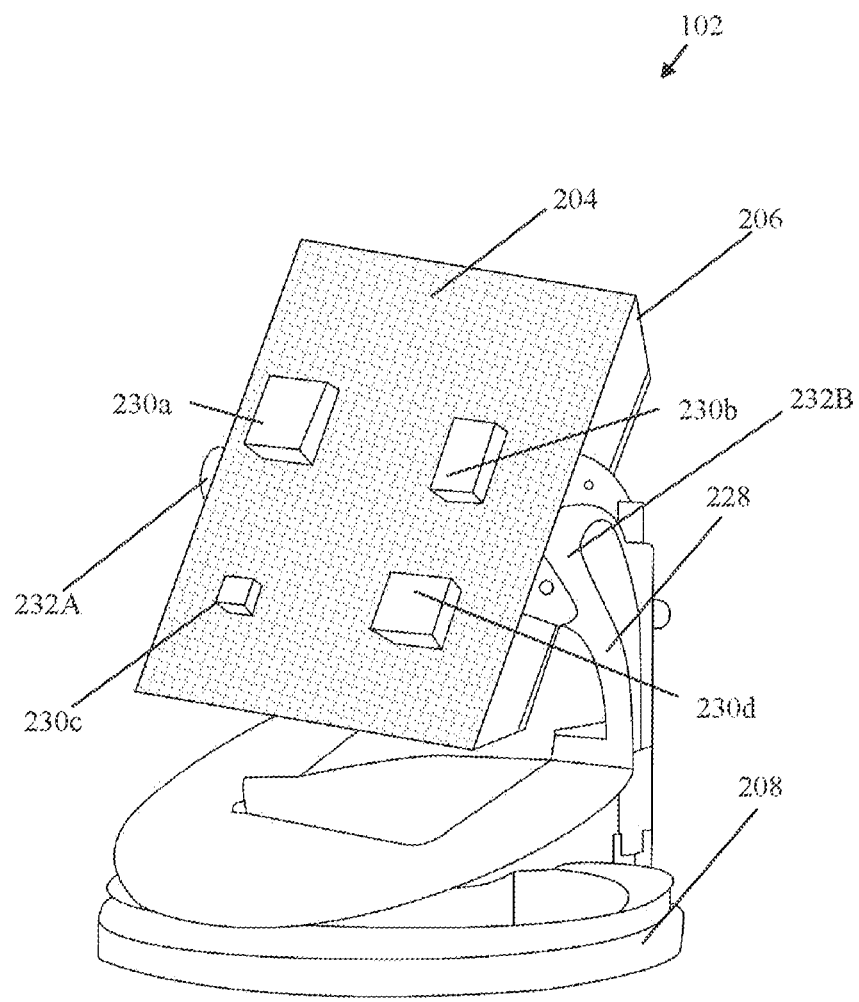
FIG. 2C is a diagram illustrating a perspective view of the antenna device of FIG. 2A with mounted planar substrate along with patch antennas, in accordance with an exemplary embodiment of the disclosure.

FIG. 2C is a diagram illustrating a perspective view of the antenna device of FIG. 2A with mounted planar substrate along with patch antennas, in accordance with an exemplary embodiment of the disclosure. FIG. 2C is explained in conjunction with elements from FIGS. 1A, 1B, 2A, and 2B. With reference to FIG. 2C, there is shown the antenna device 102 with the planar substrate 204 mounted on the movable frame 206 of the antenna device 102. There is further shown a plurality of passive patch antennas 230a, 230b, 230c, and 230d distributed on the planar substrate 204. The plurality of passive patch antennas 230a, 230b, 230c, and 230d may correspond to the plurality of passive patch antennas 202 of FIG. 2A. The support structure 228 may be provided on the base 208. In this implementation, the support structure 228 may comprise two arms 232A and 232B to hold the movable frame 208 and allow pan and tilt movement of the plurality of passive patch antennas 230a, 230b, 230c, and 230d by moving the movable frame 206. In an implementation, each of the plurality of passive patch antennas 230a, 230b, 230c, and 230d may have different size, and may protrude from the planar substrate 204 at different protrusion heights to allow improved signal reception and diversity of RF signal capture at different angles at different 3D positions, such as different pan and tilt coordinates. In an implementation, each of the plurality of passive patch antennas 230a, 230b, 230c, and 230d may be dual-polarized patch antennas to maintain high gain and directionality.

Figure 2D:
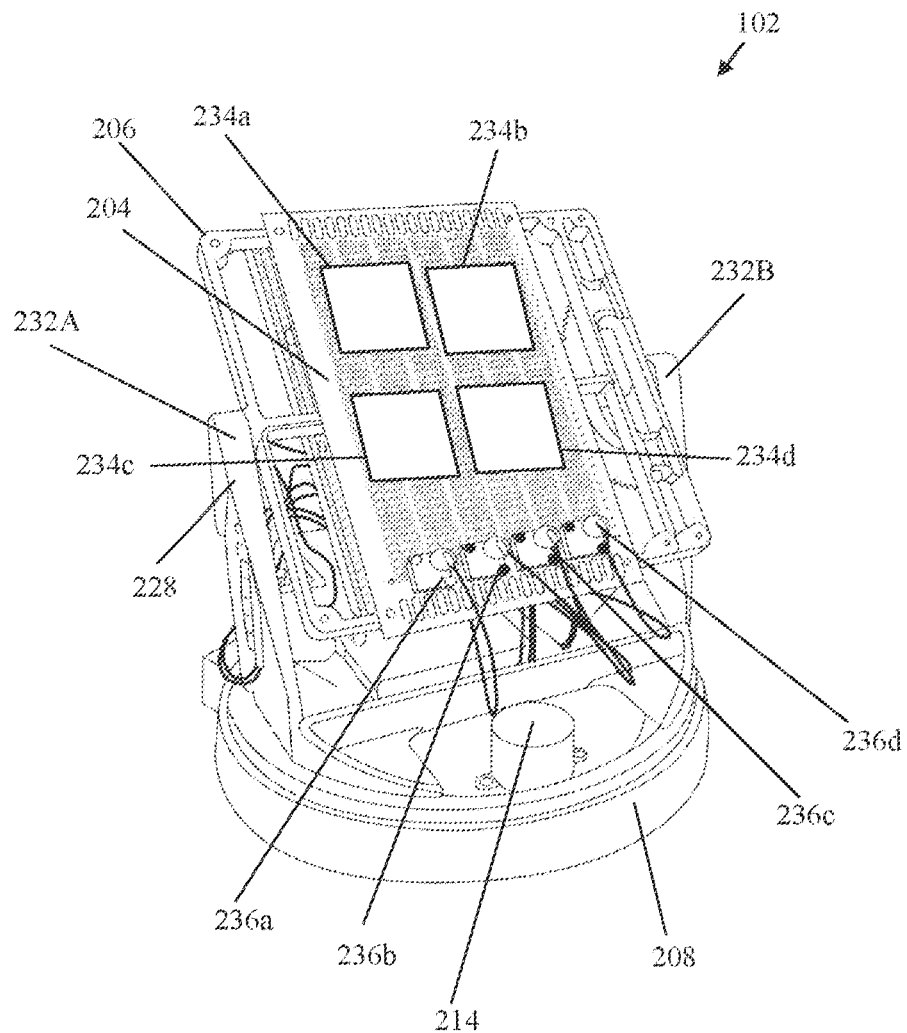
FIG. 2D is a diagram illustrating a perspective view of the antenna device of FIG. 2A, in accordance with another exemplary embodiment of the disclosure.

FIG. 2D is a diagram illustrating a perspective view of the antenna device of FIG. 2A, in accordance with another exemplary embodiment of the disclosure. FIG. 2D is explained in conjunction with elements from FIGS. 1A, 1B, and 2A-2C. With reference to FIG. 2D, there is shown the antenna device 102 with the planar substrate 204 mounted on the movable frame 206 of the antenna device 102. There is further shown a plurality of patch antennas 234a, 234b, 234c, and 234d. Two or more of the plurality of patch antennas 234a, 234b, 234c, and 234d may be connected with each other using connectors 236a, 123b, 236c, and 236d in one or more different configurations. The number of connectors 236a, 123b, 236c, and 236d may be equal to the number of the plurality of antenna ports 216. Each of the plurality of antenna ports 216 may be connected to one corresponding connector of the connectors 236a, 123b, 236c, and 236d. The support structure 228 may comprise two arms 232A and 232B projected from the support structure 228 to accommodate and movably fix the movable frame 206. There is further shown the battery 214, which may be a rechargeable battery, to power the operations of one or more components of the antenna device 102, such as the electric motor 212 and the controller 210 in this implementation.

Figure 3:
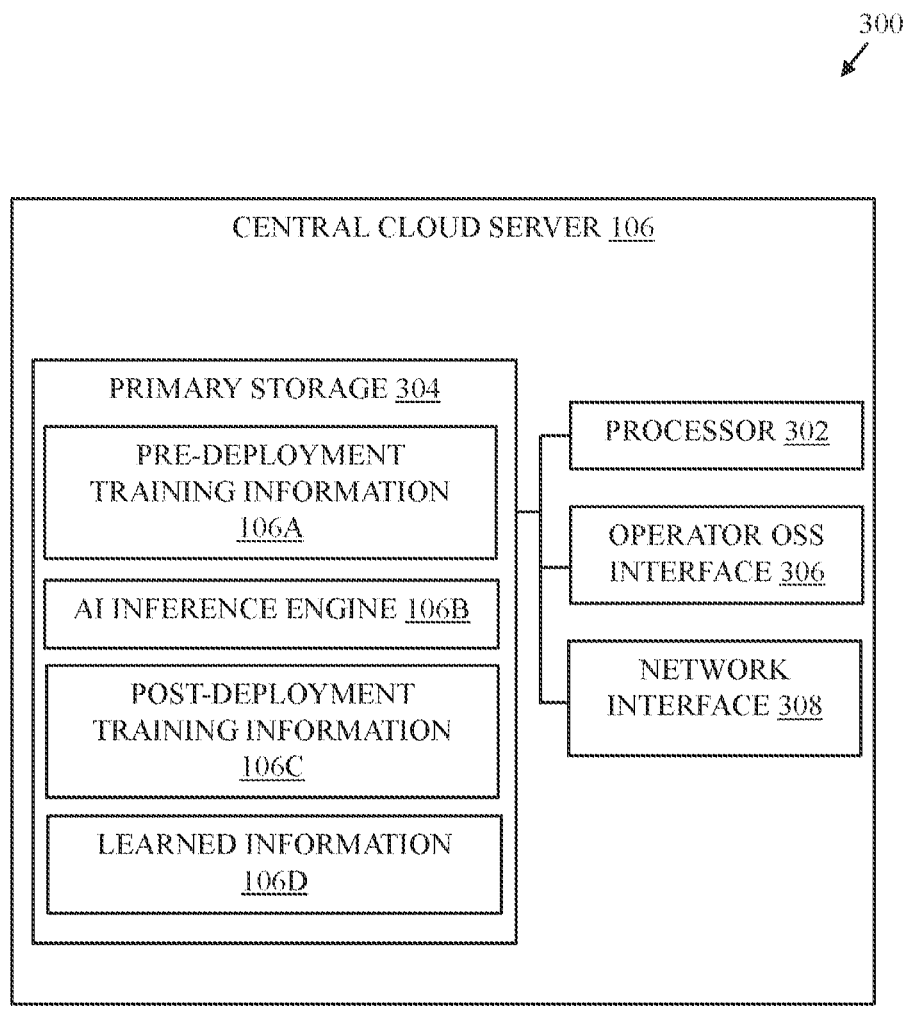
FIG. 3 is a block diagram that illustrates various components of an exemplary central cloud server, in accordance with an exemplary embodiment of the disclosure.

FIG. 3 is a block diagram that illustrates various components of an exemplary central cloud server, in accordance with an exemplary embodiment of the disclosure. FIG. 3 is explained in conjunction with elements from FIGS. 1A, 1B, and 2A-2D. With reference to FIG. 3, there is shown a block diagram 300 of the central cloud server 106. The central cloud server 106 may include a processor 302, a primary storage 304, an operator OSS interface 306, and a network interface 308. The primary storage 304 may include the pre-deployment training information 106A, the artificial intelligence (AI) inference engine 106B, the post-deployment training information 106C, and the learned information 106D (of FIG. 1B).

The processor 302 may be configured to obtain measured signal information associated with a plurality of candidate installation locations in or around the defined physical area, for example, a home, an enterprise, or a building, from the CPE 104. The processor 302 may be further configured to acquire the pre-deployment training information 106A and the post-deployment training information 106C, which may be used in the training of the AI inference engine 106B, to generate the output of the learned information 106D. Examples of the implementation of the processor 302 may include but are not limited to an embedded processor, a microcontroller, a specialized digital signal processor (DSP), control circuitry, a Reduced Instruction Set Computing (RISC) processor, an Application-Specific Integrated Circuit (ASIC) processor, a Complex Instruction Set Computing (CISC) processor, and/or other processors, or state machines.

The primary storage 304 may be a datacenter, a memory, a cloud storage, a storage or disk array. The primary storage 304 may include the pre-deployment training information 106A, the AI inference engine 106B, the post-deployment training information 106C, and the learned information 106D.

The operator OSS interface 306 may be an interface to allow the external third-party systems or applications, such as the central cloud server 106, to communicate with the Operational Support Systems (OSS) of a telecom network carrier or service provider. The OSS interface allows different parts of the OSS system to exchange data and commands with the central cloud server 106.

The network interface 308 may be used to communicate with the CPE 104. The network interface 308 may be a hardware component that enables the central cloud server 308 device to connect to a network to exchange data and commands.

In operation, the processor 302 may be configured to obtain a signal heatmap for different locations around a defined physical area, for example, around a building. The processor 302 may be further configured to obtain a plurality of candidate installation locations in or around the defined physical area where signal strength and data throughput rate is greater than threshold signal quality. The processor 302 may be further configured to tag each candidate installation location with corresponding one or more signal quality parameters. Example of the signal quality parameters may include but are not limited to a signal strength in decibels, SNR, SINR, and data throughout rate. The processor 302 may be further configured to store pre-deployment training information 106A that comprises a plurality of candidate installation locations, each tagged with corresponding one or more signal quality parameters. In a site survey, a smartphone (e.g., the UE 110A of FIG. 1B), which may have the application 118, may be communicatively coupled to the central cloud server 106. The plurality of candidate installation locations where the signal strength and performance may be greater than the threshold signal quality, may be stored locally in the application 118 as well as pushed to the central cloud sever 106.

In accordance with an embodiment, the processor 302 may be further configured to communicate guidance information to the UE 110A, where the guidance information comprises a location coordinate in or around the physical defined area to install the CPE 104 and the antenna device 102 suitable for different times of day. Like the physical defined area, the central cloud server 106 may include measured signal information about other areas surrounding the building, i.e., the physical defined area. In an example, the central cloud server 106 may be aware of traffic information of a surrounding area of the physical defined area at different times of day over a period. The processor 302 may be further configured to determine a trend and a load associated with a serving base station, such as the RAN node 108, which may serve the CPE 104 and indicate an average number of UEs expected to be serviced by the RAN node 108 at different times of day, one or more peak load time periods, one or more off-peak time periods. In another example, the central cloud server 106 may be aware of and may consider road information, construction information, and traffic light information, and other signal quality influencing information, such as movable and immobile physical structures in the surrounding area. The processor 302 may be further configured to utilize such supplementary information to generate and communicate the guidance information to the UE 110A.

In accordance with an embodiment, the processor 302 may be further configured to cause the CPE 104 and the antenna device 102 to perform a discovery operation for a defined first time period, for example, less than 5-8 minutes. The discovery operation may comprise selecting a set of parameters that comprises at least an initial pan and tilt coordinates for the antenna device 102 to orient antenna device 102 in an initial 3D test position. The discovery operation may further comprise causing the CPE 104 and antenna device 102 to discover a first 3D position for a first signal state, which may be an improved signal state (higher signal strength and higher data throughput rate) as compared to a signal state on use of the one or more inbuilt antennas 104A by the CPE 104.

In accordance with an embodiment, the processor 302 may be further configured to cause the CPE 104 and the antenna device 102 to perform a post deployment training operation for a defined second time period, for example, 24 hours. The post deployment training operation may also be referred to as a 24-hours learning process. In the post deployment training operation, the processor 302 may be further configured to acquire plurality of RF signals captured by plurality of passive patch antennas 202 of antenna device 102 via plurality of external antenna ports 112 of the CPE 104. Further, the processor 302 may be further configured to determine a signal quality value of each of the plurality of RF signals acquired via the plurality of external antenna ports 112. Further, the processor 302 may be further configured to select at least one RF signal having the highest signal quality value from among the plurality of RF signals acquired via the plurality of external antenna ports 112 for the test 3D position. The processor 302 may be further configured to obtain measured signal quality values for different 3D positions of the antenna device 102 as post-deployment training information 106C. The signal quality values may be, for example, signal strength in decibels and data throughput rate, which may be acquired for different 3D positions (e.g., different pan and tilt coordinates) at different times of day for a given location of the antenna device 102. The processor 302 may be further configured to dynamically combine one or more RF signals of the plurality of RF signals acquired via the plurality of external antenna ports 112. The processor 302 may be further configured to periodically obtain modem information from the CPE 104 with regards to impact of combining and adjusting the 3D positions of the antenna device 102 to maximize signal rank, RSRP, and SNR in the defined second time period (e.g., first 24 hours after deployment) for a first location (one of the candidate installation location) of the antenna device 102. In other words, the effect of the modem of the CPE 104 combining and adjusting the 3D positions of the antenna device 102 to maximize signal rank, RSRP, and SNR may complete in 24 hours training cycle.

In accordance with an embodiment, once the post deployment training operation for the first 24 hours after deployment, is completed, the central cloud server 106 as well as the CPE 104 becomes well aware of the signal rank, RSRP, and SNR, and data throughput rate for different times of day for different 3D positions. Thus, the processor 302 may be further configured to cause the CPE 104 to generate and communicate an instruction to the antenna device 102. The processor 302 may be further configured to cause the CPE 104 to control a movement of the movable frame 206 to align plurality of passive patch antennas 202 in a specific 3D position coordinate in a given time-of-day such that a radio frequency (RF) signal receptivity by one or more passive patch antennas of the plurality of passive patch antennas 202 in the signal capture area is increased from a first signal state to a second signal state at first location of the antenna device 102. Such control of the movement of the movable frame 206 to align the plurality of passive patch antennas 202 in the specific 3D position coordinate may be executed based on the instruction communicated by the central cloud server 106 to the CPE 104 and further passed from the CPE 104 over the out-of-band control link to the antenna device 102. The instruction received from the CPE 104 may comprise learned information 106D comprising a specific pan and tilt datum learned and stored in the learned information 106D.

In accordance with an embodiment, the processor 302 may be further configured to cause the CPE 104 to update movement of the movable frame 206 to align plurality of passive patch antennas 202 in another 3D position coordinate at another time-of-day such that a radio frequency (RF) signal receptivity by one or more passive patch antennas of the plurality of passive patch antennas 202 in the signal capture area is increased from the second signal state to a third signal state at the first location of the antenna device 102. This maintains the consistency of performance of the CPE 104 at different times of day.

In an implementation, for the training of the AI inference engine 106B, the pre-deployment training information 106A and the post-deployment training information 106C may be used as training data. A machine learning algorithm, for example, an artificial neural network algorithm, may be used at the beginning before training with the real-world training data and parameters of the modem information as response as supervised learning labels. When the machine learning algorithm is passed through the training data, the machine learning algorithm determines patterns such that the input features (e.g. a pan datum, a tilt datum, a measured signal quality parameter, a weather condition, a UE location, a time-of-day, etc.) are mapped to the learning labels (e.g., one or more 3D positions and corresponding signal strength and data throughout greater than a threshold for a given timeof-day). The processor 302 is further configured to cause the AI inference engine 106B to assign more weight to recent data points using, for example, an exponential time decay process. In an example, the hyperparameters of the AI inference engine 106B may be set and tuned depending on the formulated rules, and boundaries or limits observed based on some early training. The AI inference engine 106B may be a learned model generated as output in the training process, and thus, over a period of time, the AI inference engine 106B is able to predict the specific 3D position most suited for a given time-of-day for a given set of input features (e.g., location, time-of-day, weather, current 3D position etc). Alternatively, in another implementation a convolutional neural network (CNN) may be used for deep learning, where the input features and their relationship with the desired output values may be derived automatically. Thus, at the end of the training phase, the learned information 106D may be generated that specifies a plurality of time-of-day specific pan and tilt datum suited for a given installation location of the antenna device 102.

In an implementation, in order to initiate the discovery or a search action for optimizing the 3D position of the antenna device 102, the throughput and the bit rate or the signal strength or both may be monitored and the search action may be initiated whenever each of the throughput and the bit rate or the signal strength or both drops below corresponding level (i.e., corresponding thresholds or signal state).

Figure 4:
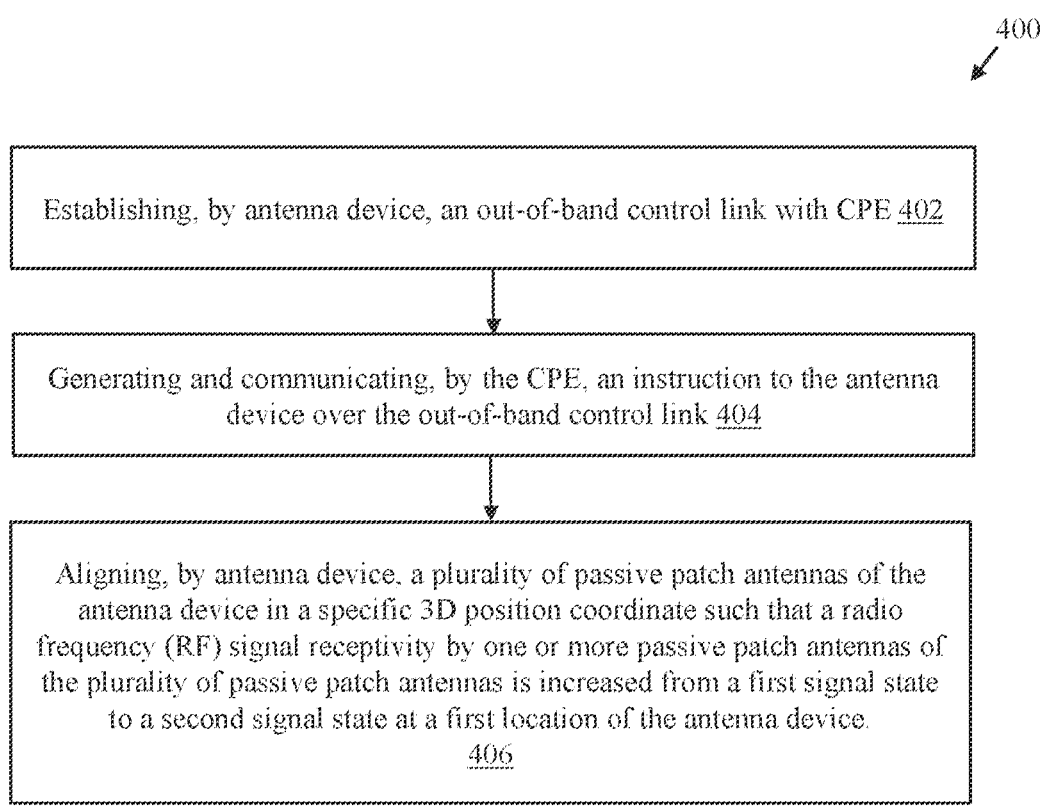
FIG. 4 is a method that illustrates an exemplary method for FWA communication for high performance wireless communication, in accordance with an embodiment of the disclosure.

FIG. 4 is a method that illustrates an exemplary method for FWA communication for high performance wireless communication, in accordance with an embodiment of the disclosure. FIG. 4 is explained in conjunction with elements from FIGS. 1A, 1B, 2A-2D, and 3. With reference to FIG. 4, there is shown a flowchart 400 comprising exemplary operations 402 to 406. The operations 402 and 406 may be implemented in the FWA communication system 100.

At 402, an out-of-band control link may be established by the antenna device 102 with the CPE 104.

At 404, an instruction may be generated and communicated by the CPE 104 to the antenna device 102 over the out-of-band control link.

At 406, a plurality of passive patch antennas 202 of the antenna device 102 may be aligned by the antenna device 102 in a specific 3D position coordinate at a given time-of-day such that a radio frequency (RF) signal receptivity by one or more passive patch antennas of the plurality of passive patch antennas 202 may be increased from a first signal state to a second signal state at a first location of the antenna device 102. The antenna device 102 significantly maximizes (i.e., improves) the signal that is being received or transmitted at the first location as compared to conventional CPEs or antenna systems.

Figure 5A:
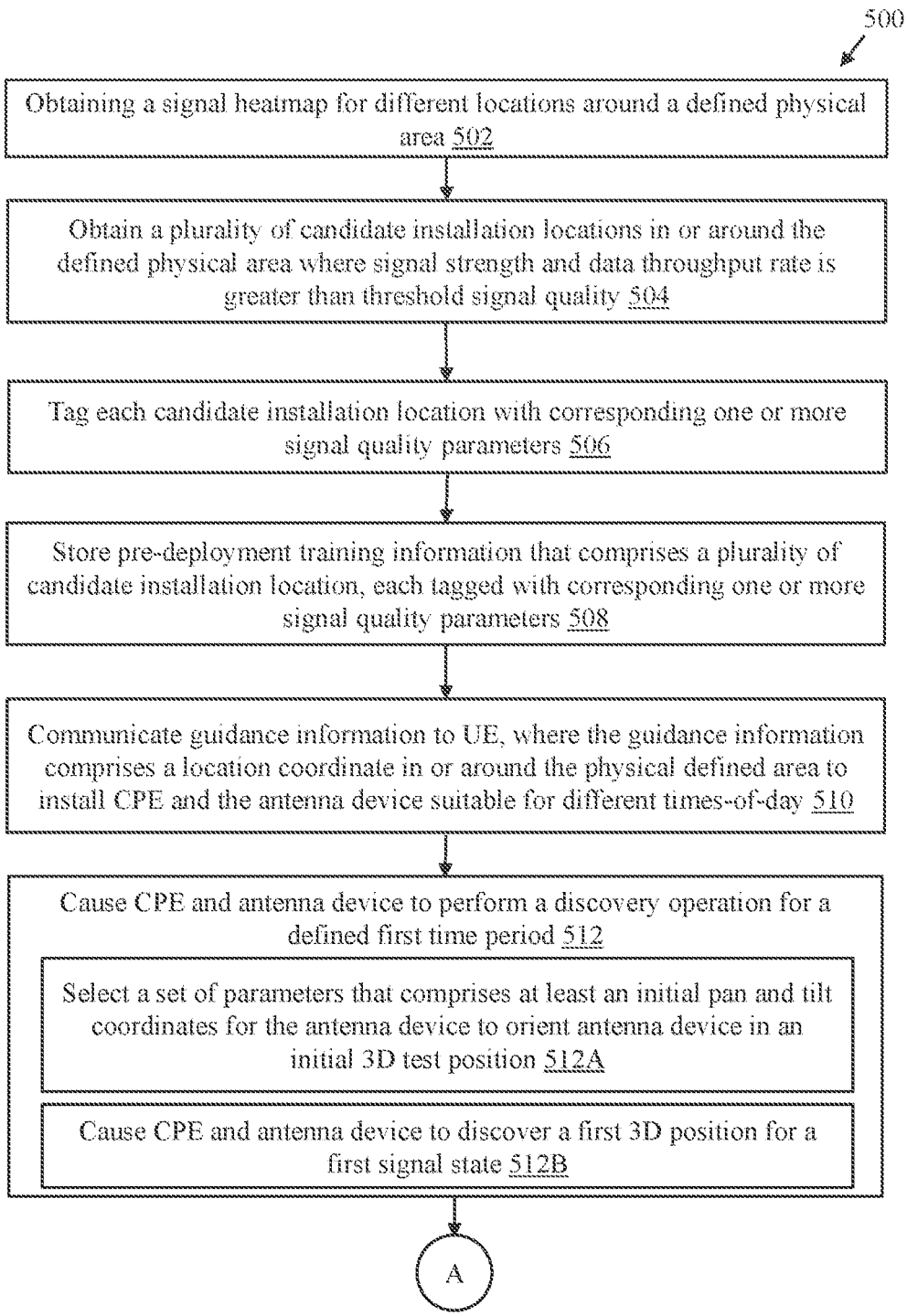
FIGS. 5A, 5B, and 5C collectively is a flowchart illustrating an exemplary method for FWA communication for high performance wireless communication, in accordance with another embodiment of the disclosure.
Figure 5B:
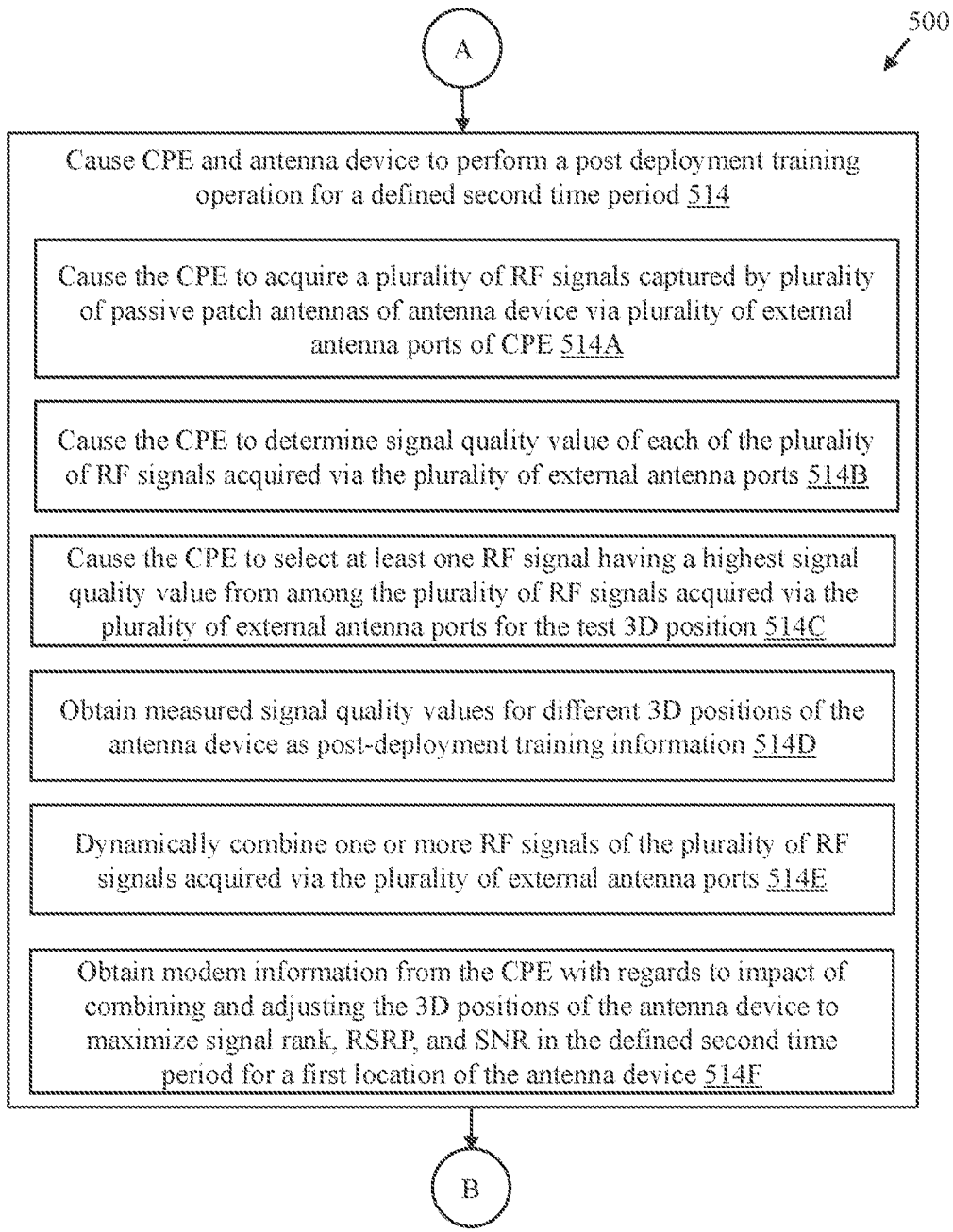
Figure 5C:
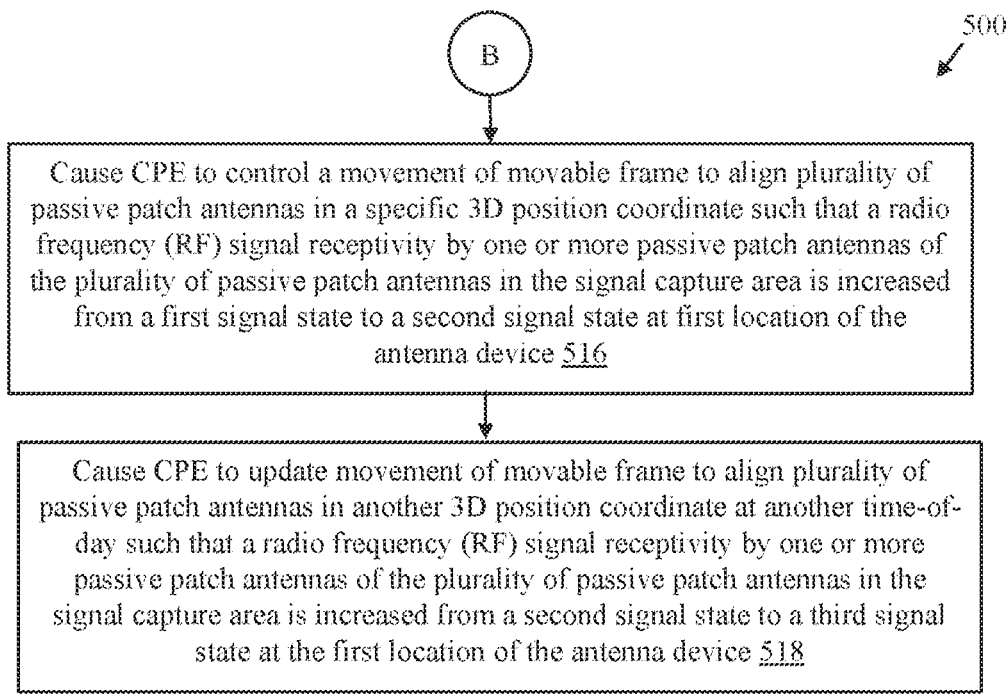

FIGS. 5A, 5B, and 5C collectively is a flowchart illustrating an exemplary method for FWA communication for high performance wireless communication, in accordance with another embodiment of the disclosure. FIGS. 5A, 5B, and 5C are explained in conjunction with elements from FIGS. 1A, 1B, 2A-2D, and 3. With reference to FIGS. 5A, 5B, and 5C, there is shown a flowchart 500 comprising exemplary operations 502 to 518. The operations 502 and 518 may be implemented in the central cloud server 106 of the FWA communication system 100.

At 502, a signal heatmap for different locations around a defined physical area may be obtained.

At 504, a plurality of candidate installation locations in or around the defined physical area where signal strength and data throughput rate is greater than threshold signal quality may be obtained.

At 506, each candidate installation location may be tagged with corresponding one or more signal quality parameters.

At 508, the pre-deployment training information 106A that may comprise a plurality of candidate installation location, each tagged with corresponding one or more signal quality parameters, may be stored, for example, at the primary storage 304.

At 510, guidance information may be communicated to the UE 110A, where the guidance information may comprise a location coordinate in or around the physical defined area to install the CPE 104 and the antenna device 102 suitable for different times of day.

At 512, the CPE 104 and the antenna device 102 may be caused to perform a discovery operation for a defined first time period, for example, less than 5-8 minutes. The discovery operation may comprise one or more operations, such as 512A and 512B.

At 512A, a set of parameters that comprises at least an initial pan and tilt coordinates for the antenna device 102 may be selected to orient the antenna device 102 in an initial 3D test position.

At 512B, the CPE 104 and the antenna device 102 may be further caused to discover a first 3D position for a first signal state.

At 514, the CPE 104 and the antenna device 102 may be caused to perform a post deployment training operation for a defined second time period, for example, 24 hours. The post deployment training operation may also be referred to as a 24-hours learning process. The operation 514, i.e., the post deployment training operation, may include one or more operations, such as operations 514A to 514F.

At 514A, the CPE 104 may be caused to acquire a plurality of RF signals captured by plurality of passive patch antennas 202 of antenna device 102 via plurality of external antenna ports 112 of the CPE 104.

At 514B, the CPE 104 may be caused to determine a signal quality value of each of the plurality of RF signals acquired via the plurality of external antenna ports 112.

At 514C, the CPE 104 may be caused to select at least one RF signal having the highest signal quality value from among the plurality of RF signals acquired via the plurality of external antenna ports 112 for the test 3D position.

At 514D, measured signal quality values may be obtained for different 3D positions of the antenna device 102 as post-deployment training information 106C. The signal quality values may be, for example, signal strength in decibels and data throughput rate, which may be acquired for different 3D positions (e.g., different pan and tilt coordinates) at different times of day for a given location of the antenna device 102.

At 514E, one or more RF signals of the plurality of RF signals acquired via the plurality of external antenna ports 112 may be dynamically combined.

At 514F, modem information may be periodically obtained from the CPE 104 with regards to impact of combining and adjusting the 3D positions of the antenna device 102 to maximize signal rank, RSRP, and SNR in the defined second time period (e.g., first 24 hours after deployment) for a first location (one of the candidate installation location) of the antenna device 102. In other words, the effect of the modem of the CPE 104 combining and adjusting the 3D positions of the antenna device 102 to maximize signal rank, RSRP, and SNR may complete in 24 hours training cycle.

At 516, the CPE 104 may be caused to control a movement of the movable frame 206 to align plurality of passive patch antennas 202 in a specific 3D position coordinate at a given time-of-day such that a radio frequency (RF) signal receptivity by one or more passive patch antennas of the plurality of passive patch antennas 202 in the signal capture area is increased from a first signal state to a second signal state at first location of the antenna device 102. Such control of the movement of the movable frame 206 to align the plurality of passive patch antennas 202 in the specific 3D position coordinate may be executed based on the instruction communicated to the CPE 104 from the central cloud server 106, which in turn further communicates the instruction to the antenna device 102 over the out-of-band control link. Alternatively, the instruction maybe generated by the remote antenna driver 114 of the CPE 104. The instruction received by the antenna device 102 may comprise learned information 106D comprising a specific pan and tilt datum.

At 518, the CPE 104 may be caused to update movement of the movable frame 206 to align plurality of passive patch antennas 202 in another 3D position coordinate at another time-of-day such that a radio frequency (RF) signal receptivity by one or more passive patch antennas of the plurality of passive patch antennas 202 in the signal capture area is increased from the second signal state to a third signal state at the first location of the antenna device 102.

Figure 6:
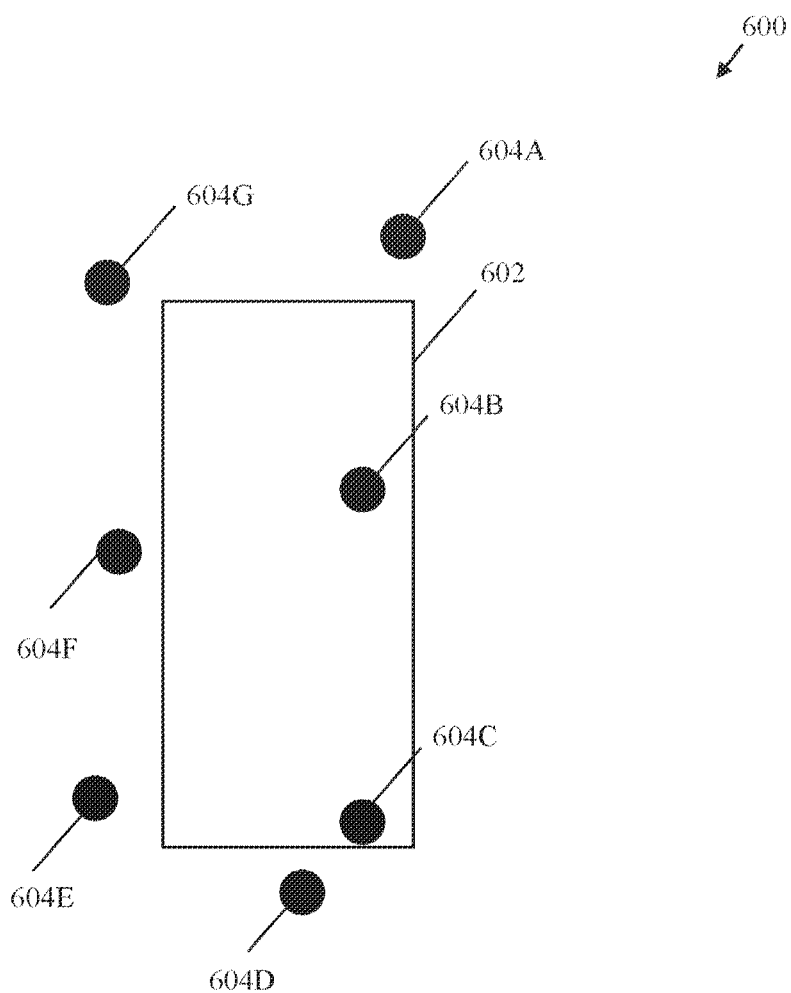
FIG. 6 is a diagram of an exemplary scenario depicting performance of a CPE at different locations around a defined physical area with and without the antenna device, in accordance with an embodiment of the present disclosure.

FIG. 6 is a diagram of an exemplary scenario depicting performance of a CPE at different locations around a defined physical area with and without the antenna device, in accordance with an embodiment of the present disclosure. FIG. 6 is explained in conjunction with elements from FIGS. 1A, 1B, 2A-2D, 3, 4, and 5A-5C. With reference to FIG. 6, there is shown a physical-defined area 602 and a plurality of locations, such as locations 604A to 604G, in or around the physical-defined area 602.

In a first example, the performance of a CPE (e.g., the CPE 104) in terms of signal receptivity of both 4G LTE and 5G signals was tested by placing the CPE at different locations around the physical defined area 602, such as the locations 604A to 604G. In this case, only internal antennas, such as the one or more inbuilt antennas 104A of the CPE 104 were used to capture RF signals received from a base station (e.g., the RAN node 108) at the cell edge (e.g., in this case, the base station was almost 1.2 km away from the CPE 104). During experimentation, the signal parameters in terms of signal strength and data throughput rate for both 4G LTE and 5G NR signals captured for the locations 604A to 604G when the one or more inbuilt antennas 104A of the CPE 104 were used, are shown below in Table 1. In Table 1, there is further shown data captured (e.g., the Reference Signal Received Power (RSRP) and Ultra-wideband (UWB)) for a smartphone, such as the UE 110A, at or near the different locations 604A to 604G, as reference. Typically, if such data is received during site survey, a network service provider may deny service for FWA service for Internet to an end consumer given low signal reception and low data throughput rate at the physical defined area 602, reasoning that the end consumer is too far away from the base station (cell edge locations). The locations 1, 2, 3, 4, 5, 6, and 7 in the "Table 1" below correspond to the locations 602A, 602B, 602C, 602D, 602E, 602F, and 602G respectively in the FIG. 6.

TABLE 1

| | 4G LTE | | RSRP of the UE 110A | |
|---|---|---|---|---|
| Location | Signal | 5G NR Signal | RSRP | UWB (NR) |
| 1 | −79.2 | −72(NR)/60 mbps | −82 | Yes(weak) |
| 2 | −84.5 | −81(NR)/75 mbps | −90 | No |

TABLE 1-continued

| | 4G LTE | | RSRP of the UE 110A | |
|---|---|---|---|---|
| Location | Signal | 5G NR Signal | RSRP | UWB (NR) |
| 3 | −91.5 | −102.2(5G NR)/25 mbps | −90 | Yes(weak) |
| 4 | −82 | −75.8(5G NR)/36 mbps | −106 | Yes(weak) |
| 5 | −86.5 | −107((5G NR)/90 mbps | −90 | Yes(weak) |
| 6 | −82 | −103.5(5G NR)/55 mbps | −93 | No |
| 7 | −84 | −79.2(5G NR)/55 mbps | −104 | Yes(weak) |

In a second example, the performance of a CPE (e.g., the CPE 104) in terms of signal receptivity of both 4G LTE and 5G NR signals was tested by placing the CPE at the same locations, such as the locations 604A to 604G, like in the first example around the physical defined area 602. However, in this case, the custom developed external antenna, such as the antenna device 102, was used to capture RF signals received from the same base station as in the first example (i.e., the RAN node 108) at the cell edge (e.g., in this case too, the base station was same 1.2 km away from the CPE 104 and the antenna device 102). During experimentation, the signal parameters in terms of signal strength and data throughput rate for both 4G LTE and 5G NR signals were captured for the locations 604A to 604G when the antenna device 102 of the present disclosure was used. In Table 1, there is further shown data captured (e.g., the Reference Signal Received Power (RSRP) and Ultra-wideband (UWB)) for a smartphone, such as the UE 110A, at or near the different locations 604A to 604G, as reference. It is to be observed that the 5G NR signal receptivity is increased at the locations 602A to 602G when the antenna device 102 was used as compared to the use of internal antennas, such as the one or more inbuilt antennas 104A of the CPE 104. The locations 1, 2, 3, 4, 5, 6, and 7 in the "Table 2" below correspond to the locations 602A, 602B, 602C, 602D, 602E, 602F, and 602G respectively in the FIG. 6. However, in this case, the antenna device 102 was not automatically calibrated for different times of day in terms of movement of the plurality of passive patch antennas 202 in different 3D position coordinates.

TABLE 2

| | 4G LTE | | RSRP of the UE 110A | |
|---|---|---|---|---|
| Location | Signal | 5G NR Signal | RSRP | UWB (NR) |
| 1 | −84.2 | −99(NR)/90 mbps | −82 | Yes(weak) |
| 2 | −80.5 | −86.2(NR)/120 mbps | −90 | No |
| 3 | −88.5 | −88.5(5G NR)/100 mbps | −90 | Yes(weak) |
| 4 | −90 | −79(5G NR)/80 mbps | −106 | Yes(weak) |
| 5 | −91.2 | −82((5G NR)/50 mbps | −90 | Yes(weak) |
| 6 | −89.5 | −101.5(5G NR)/130 mbps | −93 | No |
| 7 | −87.5 | −82(5G NR)/125 mbps | −104 | Yes(weak) |

The improvement in the performance of the same CPE, such as the CPE 104, for 5G NR signals can be evaluated from a comparison shown in Table 3, in an example. In the Table 3, there is shown a comparison of the performance of the CPE (e.g., the CPE 104) in terms of signal receptivity of 5G NR signals at the same locations, such as the locations 604A to 604G, with the one or more inbuilt antennas 104A versus the custom developed external antenna, such as the antenna device 102. It is to be observed that the 5G NR signal receptivity is increased when the antenna device 102 was used as compared to the use of internal antennas, such as the one or more inbuilt antennas 104A of the CPE 104. The locations 1, 2, 3, 4, 5, 6, and 7 in the "Table 3" below correspond to the locations 602A, 602B, 602C, 602D, 602E, 602F, and 602G respectively in the FIG. 6.

TABLE 3

| Location | CPE performance with internal antennas | CPE performance with external antenna, i.e., when connected to antenna device 102 |
|---|---|---|
| 1 | 72(NR)/60 mbps | −99(NR)/90 mbps |
| 2 | −81(NR)/75 mbps | −86.2(NR)/120 mbps |
| 3 | −102.2(5G NR)/25 mbps | −88.5(5G NR)/100 mbps |
| 4 | −75.8(5G NR)/36 mbps | −79(5G NR)/80 mbps |
| 5 | −107(5G NR)/90 mbps | −82((5G NR)/50 mbps |
| 6 | −103.5(5G NR)/55 mbps | −101.5(5G NR)/130 mbps |
| 7 | −79.2(5G NR)/55 mbps | −82(5G NR)/125 mbps |

In a third example, the antenna device 102 may then learn for 24 hours to fully complete the learning process, i.e., a training cycle after deployment and the discovery operation. In the Table 4, there is shown a comparison of the performance of the CPE (e.g., the CPE 104) in terms of signal receptivity of 5G NR signals at the same locations, such as the locations 604A to 604G, with the one or more inbuilt antennas 104A versus the custom developed external antenna, such as the antenna device 102, with the adaptive and automatic movement and alignment of the plurality of passive patch antennas 202 of the antenna device 102 in a specific three-dimensional (3D) position coordinate in a given time-of-day based on the instruction received from the CPE 104 based on the time-of-day. In this case, a significant and further improvement in terms of the performance of the same CPE, such as the CPE 104, for 5G NR signals was observed with improved data throughput rate. The locations 1, 2, 3, 4, 5, 6, and 7 in the "Table 4" below correspond to the locations 602A, 602B, 602C, 602D, 602E, 602F, and 602G respectively in the FIG. 6.

TABLE 4

| Location | CPE performance with internal antennas | CPE performance with external antenna, i.e., when connected to antenna device 102 with automatic alignment in specific 3D position at a given time-of-day |
|---|---|---|
| 1 | 72(NR)/60 mbps | −89.5(5G NR)/153 mbps |
| 2 | −81(NR)/75 mbps | −87.8(5G NR)/308 mbps |
| 3 | −102.2(5G NR)/25 mbps | −91(5G NR)/225 mbps |
| 4 | −75.8(5G NR)/36 mbps | −85(5G NR)/180 mbps |
| 5 | −107(5G NR)/90 mbps | −107((5G NR)/255 mbps |
| 6 | −103.5(5G NR)/55 mbps | −88.2(5G NR)/210 mbps |
| 7 | −79.2(5G NR)/55 mbps | −83(5G NR)/130 mbps |

In a fourth example, in exemplary table 5, there is shown, in an example, the variation in data throughput rate at different times of day for one location, such as location 2 in this case for a given pan and tilt position of the antenna device 102. Similar to location 2, at each location, the antenna device 102 learns which pan and tilt position provide comparatively higher performance in terms of signal strength and data throughput rate at different times of day in a 24 hours learning cycle.

TABLE 5

| Location# | Time-of-day | RSRP | Data Throughput Rate |
|---|---|---|---|
| Location 2 | 9:00 AM-day1 | −90.5 | 193 |
| | . . . | −89.8 | 194 |
| | . . . | −90 | 165 |
| | . . . | −88.2 | 210 |
| | . . . | −97 | 180 |
| | . . . | −89.2 | 200 |
| | . . . | −89 | 184 |
| | . . . | −96.5 | 216 |
| | . . . | −96.2 | 226 |
| | . . . | −88.5 | 208 |
| | . . . | −87.8 | 308 |
| | . . . | −97.8 | 304 |
| | . . . | −96.5 | 243 |
| | . . . | −89.2 | 193 |
| | 9:00 AM-day2 | −97.5 | 284 |

It is observed during experimentation that the fluctuations or changes in signal quality at different times-of-day may be attributed to dynamic nature of the environment. In contrast to the conventional FWA systems, the FWA communication system 100A or 100B of the present disclosure enables to improve signal quality and data throughput of the UEs, such as the one or more UEs 110, by significantly improving the performance of the CPE 104 to which the one or more UEs 110 may be connected. The antenna device 102 employs intelligent time-of-day driven automatic alignment of the plurality of passive patch antennas to improve quality of RF signals captured from the RAN node 110 (e.g., an existing base station or an existing small cell). This time-of-day driven automatic alignment of the plurality of passive patch antennas of the antenna device 102 is observed to significantly improve the data throughput rate and improve signal receptivity (i.e., signal strength of captured RF signals) in the 5G NR communication by many fold as compared to conventional CPE or conventional FWA systems.

In an implementation, it is observed that the performance of a CPE box, such as the CPE 104, can change up to 50% depending on the position of the CPE box. Some level of optimization may be achieved by rotating the CPE box (e.g., in pan only movement) to find the best signal reception. It is understood that end-users operating the CPE box are very unlikely to do this manually or constantly look for the best position. Thus, a pan-only servo system (e.g., using one electric motor) connected to the central cloud server 106 may be developed where any CPE box may be plugged on top of the pan-only servo system for near perfect positioning, for example, with best 3D position for enhanced signal receptivity, such as about 50% increase. This implementation may be a cost-effective and simplified implementation, which provides reasonable performance improvement although not as much as the external antenna, such as the antenna device 102. Beneficially, it does not require any modifications to the CPE box or the involvement of the CPE manufacturers in making the product.

Figure 7:
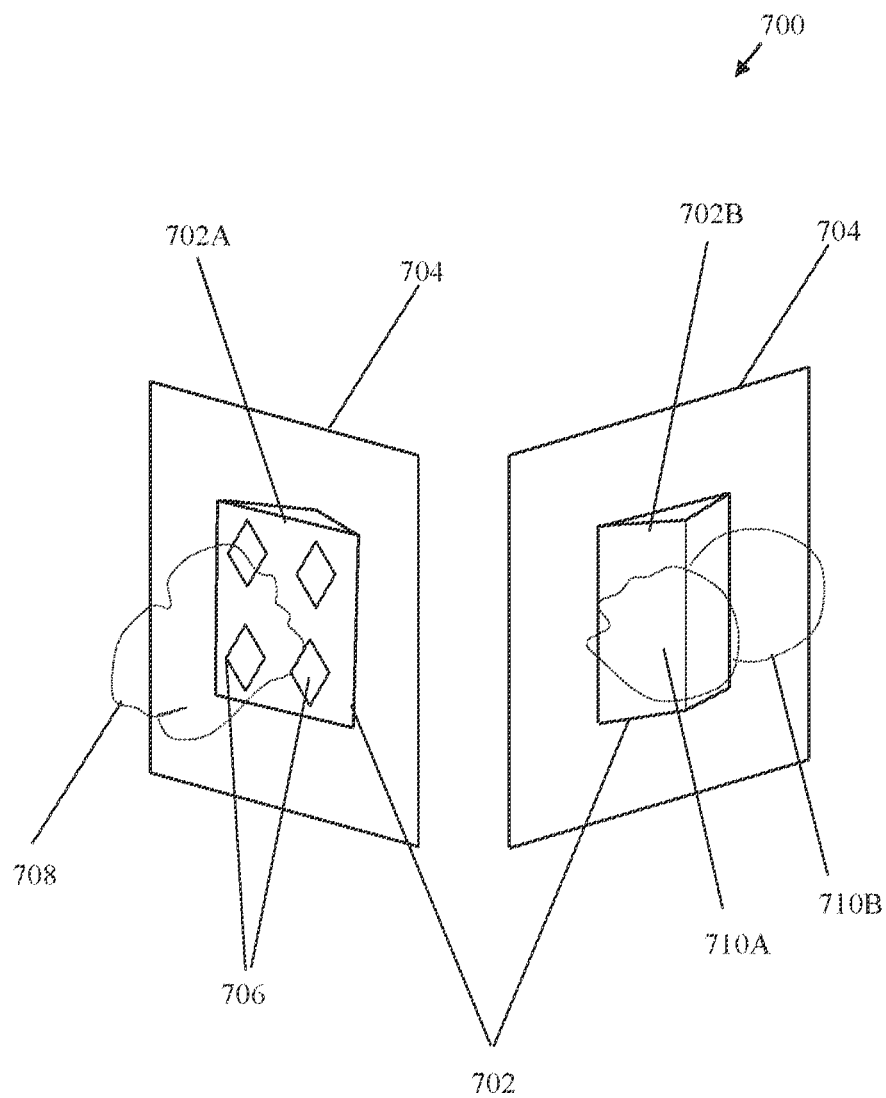
FIG. 7 is a diagram of an exemplary scenario of a repeater device with an integrated antenna device, in accordance with an embodiment of the present disclosure.

FIG. 7 is a diagram of an exemplary scenario of a repeater device with an integrated antenna device, in accordance with an embodiment of the present disclosure. FIG. 7 is explained in conjunction with elements from FIGS. 1A, 1B, 2A-2D, 3, 4, 5A-5C, and 6. With reference to FIG. 7, there is shown an exemplary scenario 700 that includes a repeater device 702 with a donor side 702A and a service side 702B (i.e., a relay side). In an implementation, the donor side 702A and the service side 702B (i.e., a relay side) may be implemented as a single box repeater device with one or two sides configured as donor sides and one or two other sides configured as service or relay sides. In another implementation, the repeater device 702 may be implemented as two distinct units or boxes connected with each other via wired or wireless means. In this case, the donor side 702A and the service side 702B (i.e., a relay side) may be affixed on a window 704. The repeater device 702 may use an integrated antenna device 706. The integrated antenna device 706 may correspond to the antenna device 102 of FIGS. 1A, 1B, and 2A.

In this implementation, the repeater device 702 may be used to provide outdoor-to-indoor coverage with the integrated antenna device 706. In an example, the repeater device 702 may be a RF Digital repeater with an LTE Modem and/or a 5G modem and may support the following: high modulation (e.g., 256QAM<2% EVM), 200 MHZ Bandwidth (Adjacent Channel Leakage Ratio (ACLR)>45 dB), Master Information Block (MIB) decoding, low latency digital channel filter <500 ns, potential frequency response equalization, gain control, real time downlink (DL)-uplink (UL) isolation (Oscillation) monitoring, AGC, saturation detection control for ADC, further support horizontal cum vertical polarization, MIMO, and may operate in a frequency band, such as n77 band: 3.2-4.2 GHz.

In accordance with an embodiment, the repeater device 702 may be a reconfigurable C-band repeater to support different modes of operation, such as implemented as a single-box indoor FWA device, may support single beam and multi beam antenna. In another embodiment, the repeater device 702 may be a two-box solution, i.e., one outdoor donor unit and one indoor service unit connected with a coaxial interface, or a wireless link over ISM band, or an optical interface. The repeater device 702 may configure itself as a part of a mesh network.

In an implementation, the integrated antenna device 706 may include a plurality of patch antennas, such as the plurality of passive patch antennas 202. The integrated antenna device 706 may be a movable device, in which the plurality of patch antennas may align itself in a specific 3D position automatically based on a time-of-day like the antenna device 102. In other words, the antenna device 102 may be integrated with the repeater device 702 to function as the integrated antenna device 706. All the operations and functions of the antenna device 102 may be performed by the integrated antenna device 706. By use of the integrated antenna device 706, a gain of about ≥15 dBi of an RF signal 708 captured at the donor side 702A was achieved and at the service side 702B, a gain of about ≥9 dBi at each patch was achieved for relayed RF signals 710A and 710B. In an implementation, the plurality of patch antennas of the integrated antenna device 706 may be movable at specific 3D position at a given time-of-day only at the donor side 702B and not at the service side 702B. In another implementation, the plurality of patch antennas of the integrated antenna device 706 may be movable at a specific 3D position at a given time-of-day both at the donor side 702B and the service side 702B.

Various embodiments of the disclosure may provide a non-transitory computer-readable medium having stored thereon computer implemented instructions that when executed by a computer causes a communication system (e.g., the FWA system 100A and 100B) to execute operations, the operations comprising establishing an out-of-band control link by the antenna device 102 with the CPE 104, generating and communicating an instruction by the CPE 104 to the antenna device 102 over the out-of-band control link, and aligning a plurality of passive patch antennas 202 of the antenna device 102 by the antenna device 102 in a specific 3D position coordinate at a given time-of-day such that a radio frequency (RF) signal receptivity by one or more passive patch antennas of the plurality of passive patch antennas 202 may be increased from a first signal state to a second signal state at a first location of the antenna device 102. The antenna device 102 significantly maximizes (i.e., improves) the signal that is being received or transmitted at the first location as compared to conventional CPEs, repeaters, or antenna systems.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:
1. A system, comprising:
an antenna device that includes:
a plurality of passive patch antennas on a planar substrate, wherein
the plurality of passive patch antennas defines a signal capture area on the planar substrate, and
the plurality of passive patch antennas is configured to protrude from the planar substrate at different protrusion heights to enable increased signal reception at different angles at different three-dimensional (3D) positions; and a movable frame configured to support the planar substrate; and
a processor configured to:
control, based on an instruction from a customer premise equipment (CPE) over an out-of-band control link, a movement of the movable frame to align the plurality of passive patch antennas in a first (3D) position coordinate at a first time-of-day such that a radio frequency (RF) signal receptivity by one or more passive patch antennas of the plurality of passive patch antennas in the signal capture area is increased from a first signal state to a second signal state at a specific location of the antenna device; and
control update of the movement of the movable frame to align the plurality of passive patch antennas in a second 3D position coordinate at a second time-of-day such that the RF signal receptivity by the one or more passive patch antennas is increased from the second signal state to a third signal state at the specific location of the antenna device, wherein the first 3D position coordinate is different from the second 3D position coordinate.

2. The system according to claim 1, wherein the processor is further configured to control the CPE and the antenna device to execute a discovery operation for a defined first time period to discover a first 3D position for the first signal state.

3. The system according to claim 2, wherein
the plurality of passive patch antennas is configured to capture a plurality of RF signals, and
the processor is further configured to:
control the CPE and the antenna device to execute a post deployment training operation for a defined second time period; and
control, based on the post deployment training operation, the CPE to:
acquire the plurality of RF signals captured by the plurality of passive patch antennas;
determine a signal quality value of each of the acquired plurality of RF signals; and
select at least one RF signal having a highest signal quality value from among the acquired plurality of RF signals.

4. The antenna device according to claim 1, wherein the instruction comprises learned information comprising a specific pan and tilt datum.

5. The antenna device according to claim 1, wherein the instruction comprises learned information that is different at different times of day.

6. The antenna device according to claim 1, wherein the plurality of passive patch antennas is detachably coupled to a plurality of external antenna ports of the CPE in a Snap-On configuration.

7. The antenna device according to claim 6, wherein one or more inbuilt antennas of the CPE are bypassed in a case where the antenna device is detachably coupled to the plurality of external antenna ports of the CPE in the Snap-On configuration.

8. The antenna device according to claim 1, wherein the antenna device is configured to:
control capture of a plurality of RF signals via the plurality of passive patch antennas; and
combine one or more RF signals of the plurality of RF signals.

9. The antenna device according to claim 3, further comprising a plurality of antenna ports connected to the plurality of passive patch antennas of the antenna device, wherein the at least one RF signal having the highest signal quality value is routed from an antenna port of the plurality of antenna ports to a corresponding external antenna port of a plurality of external antenna ports of the CPE.

10. The antenna device according to claim 1, further comprising one or more electric motors that are coupled to the movable frame, wherein the one or more electric motors are configured to control the movement of the movable frame to align the plurality of passive patch antennas in the first 3D position coordinate.

11. The antenna device according to claim 10, wherein the movement of the movable frame is automatically controllable at different times of day to align the plurality of passive patch antennas in different 3D position coordinates.

12. The antenna device according to claim 10, wherein each of the one or more electric motors is one of a stepper motor, a servo motor, an actuator, or a combination thereof.

13. A fixed wireless access (FWA) communication system, comprising:
a customer premise equipment (CPE);
an antenna device that is detachably coupled to the CPE in a Snap-On configuration, wherein
the CPE is configured to transmit an instruction over an out-of-band control link to the antenna device, and
the antenna device comprises:
a plurality of passive patch antennas on a planar substrate, wherein
the plurality of passive patch antennas defines a signal capture area, and
the plurality of passive patch antennas is configured to protrude from the planar substrate at different protrusion heights to enable increased signal reception at different angles at different three-dimensional (3D) positions; and
a movable frame configured to support the planar substrate; and
a processor configured to:
control, based on the instruction from the CPE, a movement of the movable frame to align the plurality of passive patch antennas in a first 3D position coordinate at a first time-of-day such that a radio frequency (RF) signal receptivity by one or more passive patch antennas of the plurality of passive patch antennas in the signal capture area is increased from a first signal state to a second signal state at a specific location of the antenna device; and
control update of the movement of the movable frame to align the plurality of passive patch antennas in a second 3D position coordinate at a second time-of-day such that the RF signal receptivity by the one or more passive patch antennas is increased from the second signal state to a third signal state at the specific location of the antenna device, wherein the first 3D position coordinate is different from the second 3D position coordinate.

14. The FWA communication system according to claim 13, wherein one or more inbuilt antennas of the CPE are bypassed in a case where the antenna device is detachably coupled to the CPE in the Snap-On configuration.

15. The FWA communication system according to claim 13, wherein
the CPE comprises a plurality of external antenna ports, and
the plurality of passive patch antennas are detachably coupled to the plurality of external antenna ports of the CPE in the Snap-On configuration.

16. The FWA communication system according to claim 15, wherein
the plurality of passive patch antennas is configured to capture a plurality of RF signals, and
the CPE comprises one or more processors configured to:
acquire the plurality of RF signals via the plurality of external antenna ports of the CPE; and
determine a signal quality value of each of the plurality of RF signals acquired via the plurality of external antenna ports.

17. The FWA communication system according to claim 16, wherein the one or more processors of the CPE are further configured to select at least one RF signal having a highest signal quality value from among the plurality of RF signals acquired via the plurality of external antenna ports.

18. The FWA communication system, according to claim 16, wherein
the one or more processors of the CPE are further configured to dynamically combine one or more RF signals of the plurality of RF signals to generate a combined signal, and
the combined signal is used to relay for end-user devices.

19. The FWA communication system, according to claim 13, wherein one or more of the plurality of passive patch antennas are dual-polarized patch antennas with orthogonal polarizations with a defined space among the plurality of passive patch antennas to minimize coupling between two polarizations and increase gain of the plurality of passive patch antennas.

20. A method of fixed wireless access communication, the method comprising:

establishing, by an antenna device, an out-of-band control link with a customer premise equipment (CPE), wherein
the antenna device includes a movable frame and a plurality of passive patch antennas, and
the plurality of passive patch antennas is configured to protrude from a planar substrate at different protrusion heights to enable increased signal reception at different angles at different three-dimensional (3D) positions;
communicating, by the CPE, an instruction to the antenna device over the out-of-band control link;
based on the instruction, controlling, by a processor, a movement of the movable frame to align the plurality of passive patch antennas in a first 3D position coordinate at a first time-of-day such that a radio frequency (RF) signal receptivity by one or more passive patch antennas of the plurality of passive patch antennas is increased from a first signal state to a second signal state at a specific location of the antenna device; and
controlling, by the processor, update of the movement of the movable frame to align the plurality of passive patch antennas in a second 3D position coordinate at a second time-of-day such that the RF signal receptivity by the one or more passive patch antennas is increased from the second signal state to a third signal state at the specific location of the antenna device, wherein the first 3D position coordinate is different from the second 3D position coordinate.

* * * * *